(12) United States Patent
Kitch et al.

(10) Patent No.: US 9,336,685 B2
(45) Date of Patent: May 10, 2016

(54) VIDEO LESSON BUILDER SYSTEM AND METHOD

(71) Applicants: Justin Shelby Kitch, Menlo Park, CA (US); John Paul Tokash, Pacifica, CA (US); Thai Duc Bui, Los Altos, CA (US)

(72) Inventors: Justin Shelby Kitch, Menlo Park, CA (US); John Paul Tokash, Pacifica, CA (US); Thai Duc Bui, Los Altos, CA (US)

(73) Assignee: CURIOUS.COM, INC., Menlo Park, CA (US)

( * ) Notice: Subject to any disclaimer, the term of this patent is extended or adjusted under 35 U.S.C. 154(b) by 53 days.

(21) Appl. No.: 13/965,191

(22) Filed: Aug. 12, 2013

(65) Prior Publication Data

US 2015/0046822 A1 Feb. 12, 2015

(51) Int. Cl.
| | | |
|---|---|---|
| *G06F 3/0482* | (2013.01) | |
| *G09B 5/02* | (2006.01) | |
| *G09B 7/06* | (2006.01) | |
| *G06F 3/0484* | (2013.01) | |

(52) U.S. Cl.
CPC ................ *G09B 5/02* (2013.01); *G06F 3/0482* (2013.01); *G06F 3/04842* (2013.01); *G09B 7/06* (2013.01)

(58) Field of Classification Search
CPC .................................................... G06F 3/0482
USPC ........................................................ 715/721
See application file for complete search history.

(56) References Cited

U.S. PATENT DOCUMENTS

| | | | | |
|---|---|---|---|---|
| 6,099,320 A | * | 8/2000 | Papadopoulos | ............... 434/322 |
| 6,400,886 B1 | * | 6/2002 | Brewer | ................ G11B 27/036 386/281 |
| 6,504,990 B1 | * | 1/2003 | Abecassis | .............. G11B 19/02 348/E5.105 |
| 6,988,138 B1 | * | 1/2006 | Alcorn | ..................... G09B 7/02 434/350 |
| 8,069,414 B2 | * | 11/2011 | Hartwig | ............ G06F 17/30781 715/203 |
| 8,458,595 B1 | * | 6/2013 | Margulis | ............... G06F 3/0484 715/720 |
| 8,942,542 B1 | * | 1/2015 | Sherrets | ........... H04N 21/44008 386/241 |
| 2002/0116716 A1 | * | 8/2002 | Sideman | ........... G06F 17/30017 725/91 |
| 2003/0079226 A1 | * | 4/2003 | Barrett | ................... H04N 7/163 725/46 |
| 2003/0151629 A1 | * | 8/2003 | Krebs | ...................... G09B 7/00 715/810 |

(Continued)

OTHER PUBLICATIONS iMovie, www.apple.com/ilife/imovie/what-is.html, Apple, 2013.

(Continued)

*Primary Examiner* — Reza Nabi
(74) *Attorney, Agent, or Firm* — Nwamu, P.C.

(57) ABSTRACT

An online video lesson builder system and method. The remotely-located system generates a single interface having a lesson index display area and a video display area for displaying data presentation (e.g., video) content associated with a lesson. A section control menu provides edit and assembly control buttons for editing and assembling the lesson and for segmenting the lesson into a plurality of time sections, each time section being associated with a key concept of the lesson.

30 Claims, 15 Drawing Sheets

(56) References Cited

U.S. PATENT DOCUMENTS

| | | | |
|---|---|---|---|
| 2005/0003330 A1* | 1/2005 | Asgarinejad | G09B 7/02 434/20 |
| 2005/0240980 A1* | 10/2005 | Jun | G06F 17/30852 725/135 |
| 2006/0098941 A1* | 5/2006 | Abe | G11B 27/031 386/279 |
| 2007/0030391 A1* | 2/2007 | Kim | G06K 9/00751 348/564 |
| 2007/0033515 A1* | 2/2007 | Sull | G06F 17/30796 715/202 |
| 2007/0038612 A1* | 2/2007 | Sull | G06F 17/30796 |
| 2007/0083851 A1* | 4/2007 | Huang | G06F 17/248 717/113 |
| 2007/0134640 A1* | 6/2007 | Masaoka | G06Q 30/02 434/323 |
| 2007/0183741 A1* | 8/2007 | Lerman | G06F 17/30017 386/249 |
| 2007/0250852 A1* | 10/2007 | Adams | G11B 27/034 725/28 |
| 2007/0250899 A1* | 10/2007 | Rhodes | G11B 27/034 725/136 |
| 2008/0235588 A1* | 9/2008 | Gonze | G11B 27/034 715/719 |
| 2008/0301169 A1* | 12/2008 | Hagihara | G11B 27/034 |
| 2009/0119369 A1* | 5/2009 | Chou | G11B 27/034 709/205 |
| 2009/0125967 A1* | 5/2009 | Perlman | A63F 13/12 725/133 |
| 2009/0136141 A1* | 5/2009 | Badawy | G06F 17/30781 382/225 |
| 2009/0183201 A1* | 7/2009 | Dasgupta | G09B 7/00 725/40 |
| 2009/0263777 A1* | 10/2009 | Kohn | G09B 7/00 434/350 |
| 2010/0014826 A1* | 1/2010 | Kojo | G11B 27/034 386/278 |
| 2010/0046908 A1* | 2/2010 | Kinaka | G11B 20/00007 386/285 |
| 2010/0067863 A1* | 3/2010 | Wang | G11B 27/034 386/279 |
| 2010/0141655 A1* | 6/2010 | Belinsky | G11B 27/28 345/440 |
| 2010/0188580 A1* | 7/2010 | Paschalakis | G06F 17/30802 348/571 |
| 2010/0199295 A1* | 8/2010 | Katpelly | H04L 67/306 725/14 |
| 2010/0246944 A1* | 9/2010 | Yang | G06F 17/30253 382/165 |
| 2010/0260468 A1* | 10/2010 | Khatib | G06F 11/0757 386/278 |
| 2010/0287475 A1* | 11/2010 | van Zwol | G06F 3/04817 715/723 |
| 2010/0325547 A1* | 12/2010 | Keng | G11B 27/034 715/723 |
| 2011/0199540 A1* | 8/2011 | Kanjanapitak | G11B 27/28 348/571 |
| 2011/0268426 A1* | 11/2011 | Kikuchi | G11B 27/034 386/278 |
| 2011/0276881 A1* | 11/2011 | Keng | G11B 27/034 715/723 |
| 2012/0014672 A1* | 1/2012 | Kasuya | G11B 27/034 386/281 |
| 2013/0011121 A1* | 1/2013 | Forsyth | H04N 9/8227 386/245 |
| 2013/0047082 A1* | 2/2013 | Long | G06F 3/0488 715/708 |
| 2013/0077940 A1* | 3/2013 | Shackleton | H04N 5/91 386/249 |
| 2013/0124996 A1* | 5/2013 | Margulis | G06F 3/0484 715/719 |
| 2013/0191445 A1* | 7/2013 | Gayman | H04L 29/06047 709/203 |
| 2013/0236162 A1* | 9/2013 | Kim | G11B 27/034 386/278 |
| 2013/0259447 A1* | 10/2013 | Sathish | H04N 9/87 386/278 |
| 2013/0294751 A1* | 11/2013 | Maeda | H04N 9/87 386/282 |
| 2013/0343727 A1* | 12/2013 | Rav-Acha | G11B 27/28 386/282 |
| 2014/0026053 A1* | 1/2014 | Huang | G06F 3/0481 715/723 |
| 2014/0079371 A1* | 3/2014 | Tang | H04N 21/8586 386/240 |
| 2014/0087349 A1* | 3/2014 | Kitch | G09B 5/065 434/308 |
| 2014/0161422 A1* | 6/2014 | Peng | G11B 27/034 386/278 |
| 2014/0212109 A1* | 7/2014 | Gilley | G06Q 30/02 386/278 |
| 2014/0272892 A1* | 9/2014 | Rozycki | G09B 5/08 434/350 |
| 2014/0272906 A1* | 9/2014 | Flannery | G09B 7/06 434/362 |
| 2014/0335497 A1* | 11/2014 | Gal | G09B 7/00 434/323 |
| 2014/0356845 A1* | 12/2014 | Huber | G09B 5/08 434/362 |
| 2015/0004587 A1* | 1/2015 | Rozycki | G09B 7/02 434/322 |
| 2015/0058733 A1* | 2/2015 | Novikoff | G11B 27/031 715/723 |

OTHER PUBLICATIONS

Udemy, www.udemy.com, creating a course, Udemy.

* cited by examiner

VIDEO LESSON BUILDER SYSTEM AND METHOD

COMPUTER PROGRAM LISTING APPENDIX

A computer program listing appendix is provided on CD-R with this application. The CD-R includes the file appendix.txt, size 281KB, created Mar. 10, 2016. The material on the CD-R is hereby incorporated by reference as if set forth in full in this application for all purposes. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text; otherwise all copyright rights are reserved.

BACKGROUND OF THE INVENTION

The present invention relates generally to computer information and communication systems and methods and more specifically to computer information and communication systems and methods for building video content for learning.

One fundamental human trait is our desire to continue learning. We might want to learn for personal reasons, for reasons related to work or for other reasons. As an example, a user might want to learn how to play the guitar. As another example, a user might wish to improve his or her understanding of a particular technology.

The Internet has made it particularly convenient to learn and teach by providing flexibility. Thus, many entities now use video content to offer online courses to reach a widespread audience via the web. Such video content is usually created using video capture devices such as a video camera, camera phone or the like.

Often, content creators are limited by the capabilities of the video capture device and must usually present or publish the video content "as is" for viewing on a generic website or the like. After publication, the content creator wishing to modify or update original video content, must usually create a new or modified content, which is then again uploaded for publishing. Thus, conventional systems for creating or modifying such online courses and corresponding video content can be time-consuming, arduous and can involve a multiplicity of steps.

It is within the aforementioned context that a need for the present invention arises, and there is a need to address one or more of the foregoing disadvantages of conventional systems and methods, and the present invention meets this need.

BRIEF SUMMARY OF THE INVENTION

Various aspects of a video lesson builder system and method can be found in exemplary embodiments of the present invention.

In a first aspect, the lesson builder system can create online video lessons, series, courses and the like for publication to online users. By employing a single, yet comprehensive interface, the lesson builder system of the present invention can quickly assemble, edit and publish online video lessons unlike conventional systems and methods.

Specifically, a remotely-located instructor/content creator wishing to build an online video lesson begins by initiating the lesson builder system and then uploading one or more video data files for the online video lesson. The video data files, which might be MP4 or other compatible container formats, are associated with the video lesson for viewing by an end user.

More specifically, the lesson builder system initially creates a first lesson and then associates this first lesson with the received video data file for display in the video display area. In one exemplary embodiment, the first lesson might be an empty vessel with instructions to play the video data file.

Among other features, the lesson builder system includes a video display area approximately centered on a display screen for viewing the video lesson. The lesson builder system also includes a lesson list display area and a section control menu proximate to the video display area.

Contemporaneously and in real time, as the video lesson is played in the video display area, the section control menu is used to manipulate/edit the video lesson. The section control menu might include a split control button that segments a lesson into two or more time sections. The section control menu may also include an add control button that uses additional video data files to add additional time sections to an existing lesson.

As the video lesson is played, the lesson builder system also displays a timeline having a playhead. Here, the width of the timeline remains fixed irrespective of whether a time section is added or deleted from the video lesson. For example, when a new time section is added, the representation of the new and existing time sections is time scaled in proportion to the duration of the time sections to fit within the fixed-width timeline.

As the video lesson is further played in real time, the section control menu is employed to edit/manipulate contiguous and noncontiguous elements of the video data file into a plurality of contiguous time sections, each time section associated with a key concept of the online video lesson. All of the time sections can then be played in the video display area in a linear and smooth manner.

Thus, unlike conventional systems for creating or modifying online courses that are time-consuming, arduous and can involve a multiplicity of steps, the lesson builder system of the present invention provides a single interface that is simple, efficient and can be utilized with minimal effort to accomplish creation of online video lessons and courses.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

An example of a website for implementing the system and method of the present invention is locatable at www.curious.com. The term "website" is generally applicable to a method for downloading/uploading and should not be construed as being limited to content downloaded/uploaded via Internet or HTTP (HyperText Transmission Protocol). Note also that server-performed functionality can also be performed on the client side as well.

Figure 1:
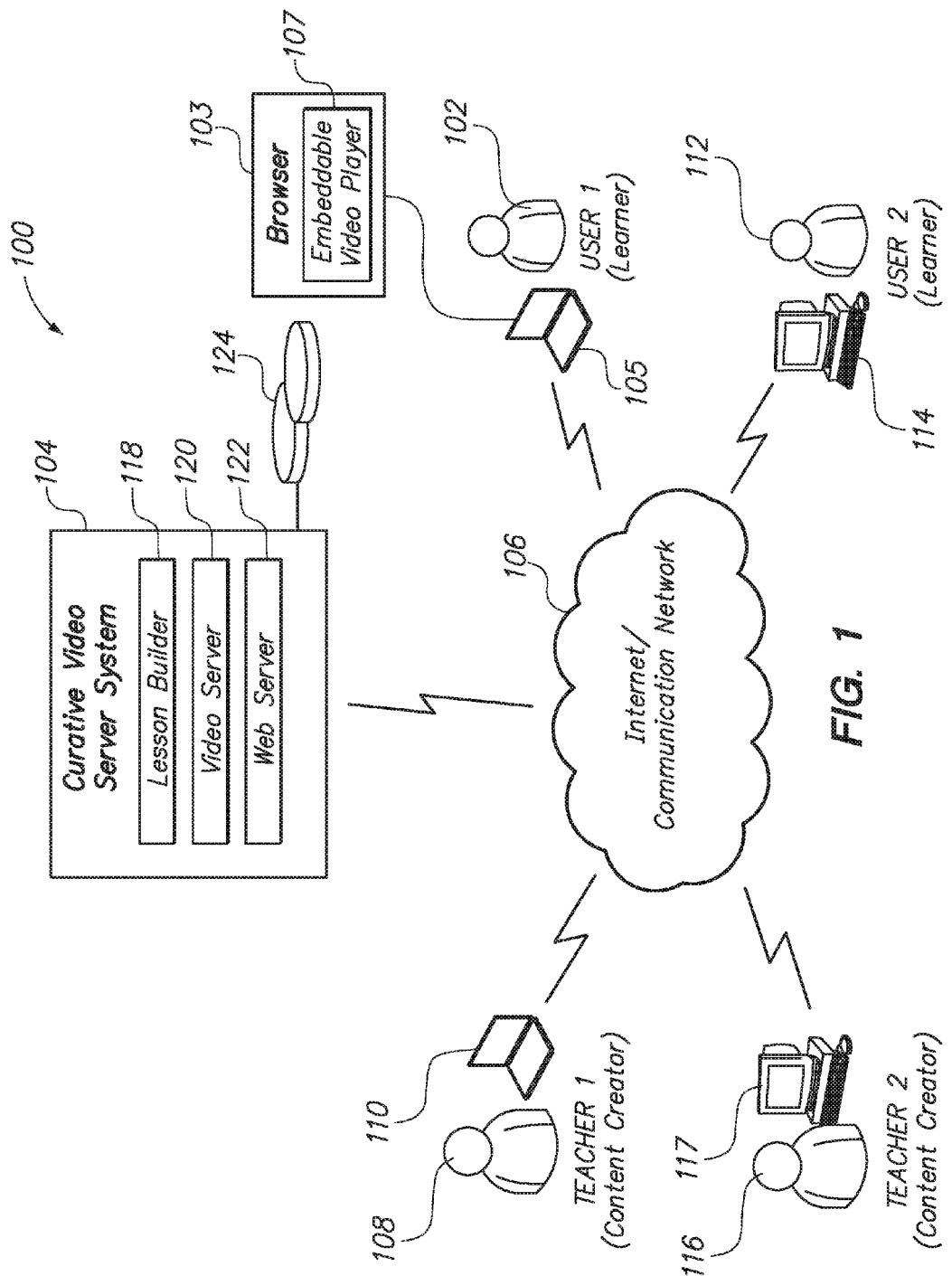
FIG. 1 illustrates a curative video communication system according to an exemplary embodiment of the present invention.

FIG. 1 illustrates curative video communication system 100 according to an exemplary embodiment of the present invention.

In FIG. 1, curative video communication system 100 comprises, among other components, a learner or user 102 communicably coupled to curative video server system 104 via Internet/communication network 106. Internet/communication network 106 can be any network, wireless or wired, whether direct or indirect that allows data communication from one point to another.

As shown, curative video communication system 100 further comprises a content creator such as teacher 108 or 116 also communicably coupled to curative video server system 104 via Internet/communication network 106. Here, teacher 108 might be a skilled individual, an expert or any entity that is skilled in any subject matter and who wishes to use video content to teach that subject matter.

Teacher 108 produces such video content to impart knowledge about subject matter on which the teacher is skilled. For example, teacher 108 might produce video content on playing the guitar. As another example, teacher 108 might be an expert sourdough baker teaching the fine art of sourdough bread baking. Further yet, teacher 108 might be an expert pesto chef.

Once video content is produced, teacher 108 can then utilize client laptop 110 for uploading of the video content to curative video server system 104. As will be further discussed, curative video server system 104 can then be employed for curating the video unlike conventional online video systems in which the video content is simply deposited for online viewing by users like user 102.

Moreover, unlike complicated conventional systems, the video builder method of the present invention employs a simple, yet sophisticated interface for quickly editing, assembling and publishing online video lessons to a personal directory assigned to the content creator. A WYSIWYG (What You See is What You Get) interface is employed that renders an actual representation of the video without the need for preview. This interface further provides within a single interface all of the operational controls needed for segmenting, building, section settings, etc. to create the online video lesson with minimal effort.

User 102 might be an individual seeking to improve his or her understanding of a particular subject matter. Thus, user 102 can be a student, a homemaker, a worker, etc. Using client laptop 105, user 102 can access curative video server system 104 to retrieve video content for the desired subject matter. Similarly, in FIG. 1, another learner such as user 112 can use client desktop 114 to access curative video server system 104.

In FIG. 1, a content creator such as teacher 116 can also use client desktop 117 to upload video content to curative video server system 104, said video content being accessible to both user 102 and user 112. In this manner, the present invention provides a unique, distributed curative video teaching and learning system that matches teachers and learners not hereinbefore available or seen in conventional systems.

Content creators such as teacher 108 and teacher 116 can provide content and be matched with consumers such as user 102 and user 112. Video content is associated with specific subject matter so that users 102 and 112 need not spend invaluable amounts of time searching for video content that does not match their needs. As will be further described, an embodiment of the embeddable video player of the present invention displays video content that is time into sections so that users can quickly identify and proceed to relevant sections of a video lesson.

Referring now to FIG. 1, curative video server system 104 includes lesson builder 118, video server 120 and web server 122. Although shown separately as a server cluster, one skilled in the art will realize that the functionality of all of the servers can be provided by a single server.

Here, web server 122 serves up web pages through which media content can be accessed by users 102 and 112. Such video content might be accessible, for example, at www.curious.com. Video server 120 retrieves available video content from database 124 for streaming or downloading to users 102 and 112. One skilled in the art will realize that video server 120 may include additional functionality.

Lesson builder 118 curates video content received from teachers for distribution to users. In accordance with unique aspects of the present invention, lesson builder 118 can divide video content into a plurality of lessons, each lesson being segmented into time sections that are complete subsections or chapters related to a subtopic of the lesson. Other advantages of the present invention (e.g. embedded attachments, etc.) are further described below with reference to the following paragraphs.

After curation of content, lesson builder 118 might then generate one or more code instructions comprising embeddable video player 107 for downloading to client laptop 105. User 102 can then employ embeddable video player 107 for viewing the video content. Note that the task of generating one or more instructions for embeddable video player 107 need not be performed by lesson builder 118. Operation of curative video communication system 100 will now be described.

In use, content creator or teacher 108, for example, may desire to create a lesson on a subject matter in which teacher 108 is skilled. For example, teacher 108 can create a lesson on playing the guitar, making sourdough bread, building a house, on philosophy, on particular humanities, Java coding, etc.

Teacher 108 begins by creating a video on playing the guitar, for example. Teacher 108 is not limited to a single lesson but can produce multiple or a plurality of lessons as part of a single course. Teacher 108 begins by using a recording device such as a video camera, a camera phone or other like to create the guitar video lesson.

The guitar video lesson is recorded or converted into a Web-readable format such as MPEG-4, etc. Upon completion, teacher 108 uses a web browser (not shown) on client laptop 110 to upload the guitar video lesson to curative video server system 104. The guitar video lesson is then stored in database 124. At this point, teacher 108 can then access the video content for curation.

By curating, it is meant that lesson builder 118 is used to add, delete, format, reformat, etc., in a manner that improves usability and functionality of the uploaded video content in accordance with the spirit and scope of the present invention. In one embodiment, teacher 108 uses lesson builder 118 to curate the uploaded video by, for example, segmenting the video lesson into time sections that identify separate sections of the video lesson. In other embodiments, the video lesson may also be curated by hanging attachments or exercises on the video frames and by providing overlay animation. Once curated, the guitar video lesson (or video clips) is cataloged and stored in database 124 for access by users.

User 102, wishing to become more proficient at playing the guitar, begins by firing up browser 103 in client laptop 105 to send an HTTP request for the guitar video lesson. Preliminarily, user 102 would have to register and log into the curative video server system 104 website. Once logged in, user 102 can browse available video content and then locate the desired guitar video lesson after which the HTTP request is sent.

Browser 103 can typically interpret traditional HTML (Hypertext Markup Language), although any comparable markup language consistent with the spirit and scope of the present invention can be used. The HTTP request is sent to a website (not shown) hosted by web server 122 of curative video server system 104.

In response, in one embodiment, web server 122 returns a guitar lesson web page (not shown) to browser 103. In one embodiment, the guitar lesson web page is embedded with embeddable video player 107. Embeddable video player 107 may include embedded scripts or applications that can play the guitar video lesson in conjunction with a player plug-in (not shown) residing on client laptop 105. An example of such a player plug-in might be Shockwave Flash available from Adobe, Inc., of San Jose, Calif.

One skilled in the art will realize that the present invention is also applicable to other computing type devices that have browsers and the like. Thus, although not shown, client laptop 105 may be tablet, mobile communication device, etc. In that case, such a device would utilize some other video player such as that incorporated in HTML 5.

The embedded scripts might be JavaScript and/or ActionScript. One skilled in the art will recognize that other comparable code can be employed. The ActionScript code is executed by the browser plug-in to play one or more portions of the guitar video lesson. The embedded applications might comprise JavaScript code including data retrieval applications for retrieving text for populating a portion of the guitar lesson web page, the address of JPEG images, the name of video files, the format of individual video files, etc.

In one embodiment, the guitar lesson web page is displayed in a display window comprising two sections: a main display section for displaying the video itself and a secondary or menu window for displaying a plurality of lessons that comprise the guitar video course. The main display window includes a play button that, once selected, enables the user to continue to use embeddable video player 107 and the browser plug-in for playing the selected guitar video lesson.

One of ordinary skill in the art will realize that the guitar lesson need not be played in a display window comprising two sections. Thus, although not shown, the guitar lesson web page may be displayed in a single display window. Lessons might be selected from the single display window and played therein as well.

Figure 2:
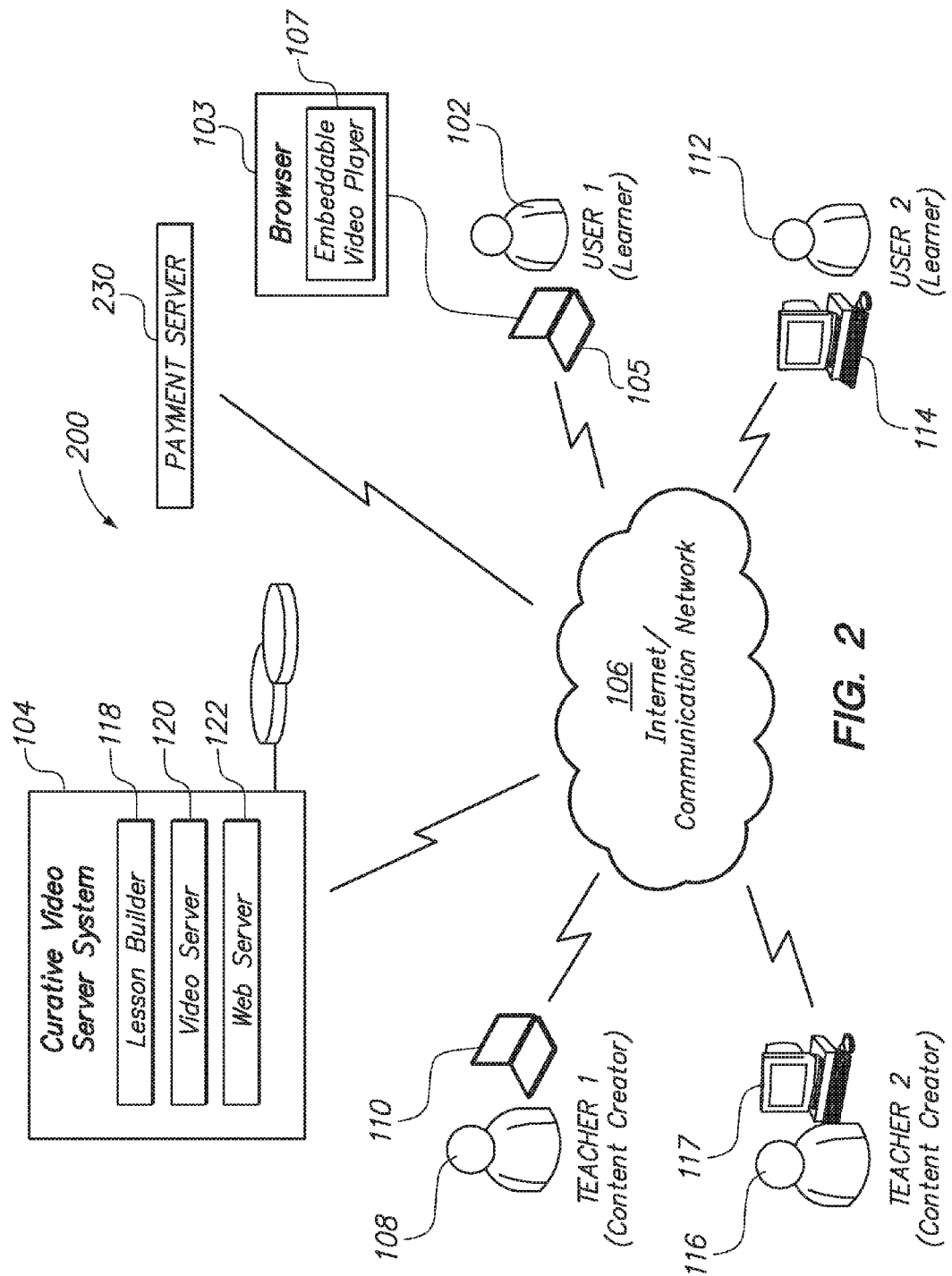
FIG. 2 illustrates a curative video communication system in accordance with an exemplary embodiment of the present invention.

FIG. 2 illustrates curative video communication system 200 in accordance with an exemplary embodiment of the present invention.

In FIG. 2, curative video communication system 200 comprises payment server 230 in addition to components discussed with reference to FIG. 1. Although not shown, payment server 230 may itself be integrated with curative video server system 104. Payment server 230 automatically debits user accounts to pay for access to video content in accordance with charges determined by content creators and/or curative video server system 104.

In this manner, the present invention provides a novel and significant distribution channel that matches content creators and content users and automatically secures payments for content creators for videos consumed by content users. Lesson Builder 118 interface screenshots for building video lessons will now be discussed with reference to FIGS. 3-13 below.

Figure 3:
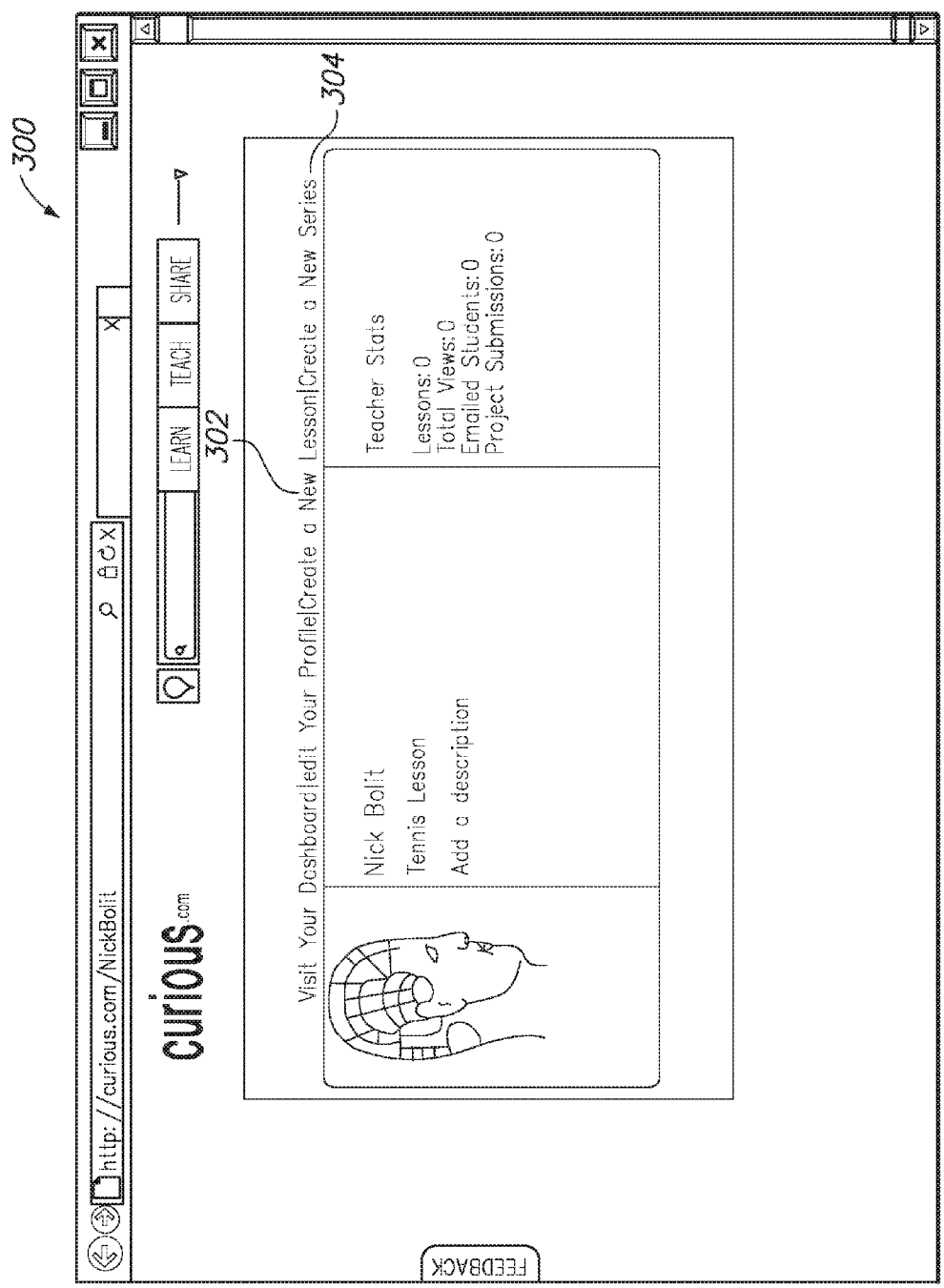
FIG. 3 is a screenshot illustrating a teacher homepage of the video lesson builder according to an exemplary embodiment of the present invention.

FIG. 3 is a screenshot illustrating teacher homepage 300 of the video lesson builder according to an exemplary embodiment of the present invention.

In FIG. 3, content creators can employ teacher homepage 300 to initiate building of one or more video lessons to teach any subject matter in which the content creator has expertise. Once created, the video lessons can then be published for viewing by students.

As an example, a content creator such as teacher 108 (FIG. 1) may have significant tennis coaching experience and might wish to create a tennis lesson video to reach a widespread student audience via communication system 100. Teacher 108 can utilize teacher homepage 300 to build this tennis lesson as further described with reference to the figures below. As another example, teacher 116 (FIG. 1) may be an experienced biology teacher; she can also utilize teacher homepage 300 to create one or more series of biology video lessons for user consumption.

Specifically, in FIG. 3, teacher 108 can select "Create a New Lesson" link 302 to create a new video lesson or may select "Create a New Series" link 304 to create a new series of lessons. Herein is an advantage of the present invention. Without third-party or manual intervention, teacher 118 can create new video lessons and categorize and compartmentalize them into series or other hierarchal categories or subcategories.

The video lessons may be categorized into groups such as series or courses, for example. Each video lesson can also be subdivided into subgroups or sections based on key concepts or subtopics. Each video lesson then becomes a selectable thumbnail displayed on the teacher's profile page.

Here, a lesson teaches subject matter for a particular topic. A series can include one or more lessons that teach the particular topic. One skilled in the art will realize that the particular nomenclature used in categorizing the lessons or subsections thereof is not critical so long as such lessons are categorized as part of a hierarchy. Thus, series, courses, parts, etc. may be used interchangeably to categorize video lessons.

Referring to FIG. 3, after "Create a New Lesson" link 302 is selected, teacher 108 may utilize file browsing window 406 (FIG. 4) to select or upload desired video data files (video lesson files) as discussed with reference to FIG. 4.

Figure 4:
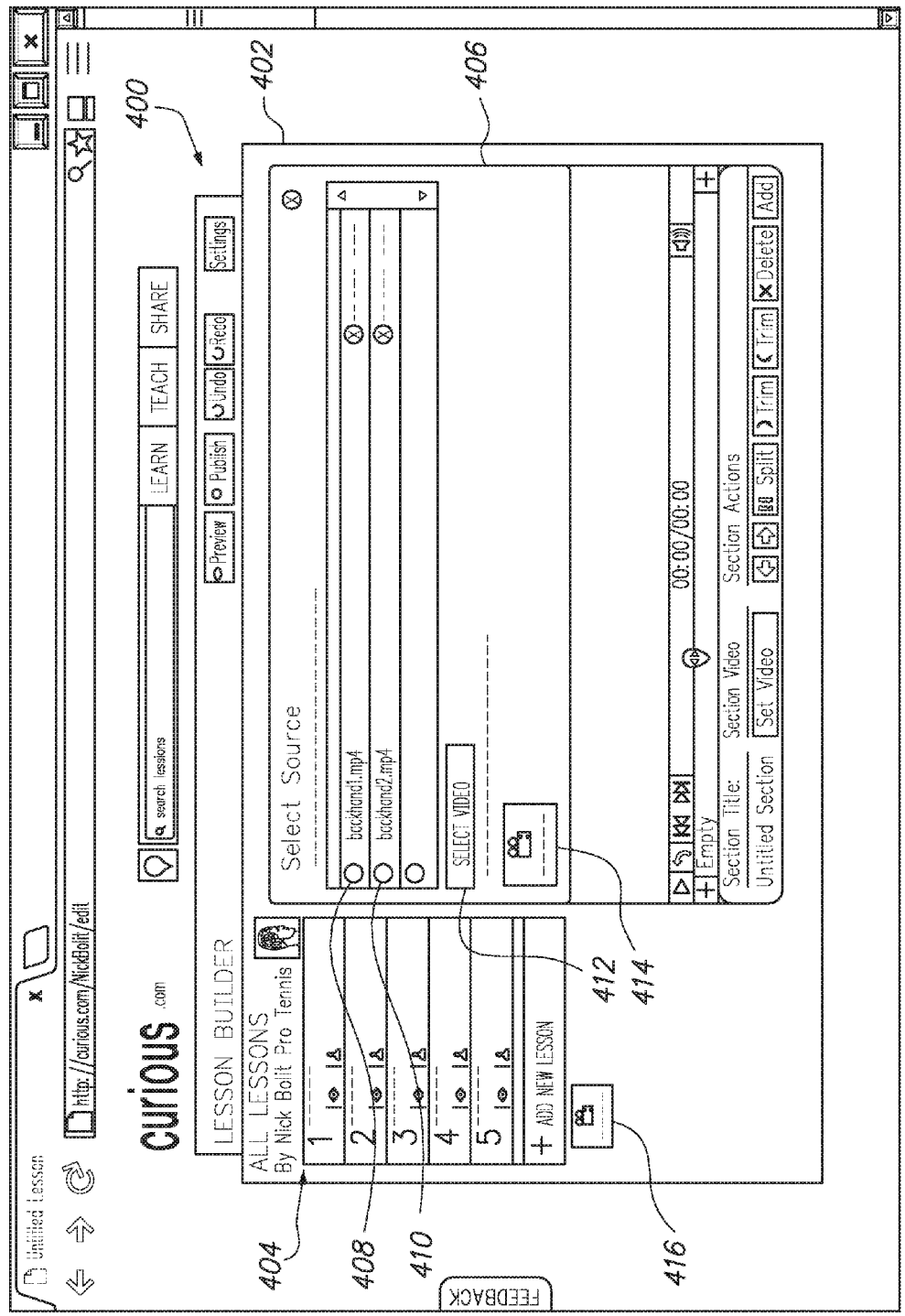
FIG. 4 is a screenshot illustrating a lesson builder interface according to an exemplary embodiment of the present invention.

FIG. 4 is a screenshot illustrating lesson builder interface 400 according to an exemplary embodiment of the present invention.

In FIG. 4, lesson builder interface 400 comprises main display window 402 and secondary window 404 for displaying a video lesson for editing/building. Main and secondary display windows 402 and 404 are further described with reference to corresponding windows of FIG. 5.

In FIG. 4, specifically, file browsing window 406 displayed over secondary display window 404, has been opened by teacher 108 to select the desired video data (lesson) file for the first lesson for editing/assembling. As noted above, teacher 108 opens file browsing window 406 by selecting "Create a New Lesson" link 302 of FIG. 3. As shown here, file browsing window 406 indicates that two video data files, backhand1.mp4 and backhand2.mp4 are available for selection for editing/building.

Video data files are available if they have been previously uploaded to curative video server system 104 (FIG. 1). If no video data file is available, teacher 108 can use "Upload Video" button 416 for uploading desired video data files.

Here, as noted, teacher 108 has previously uploaded two video data files: backhand1.mp4 and backhand2.mp4. Teacher 108 can either select radio button 408 corresponding to video data file "backhand1.mp4" or radio button 410 corresponding to backhand2.mp4" to open the desired video data file. As shown, teacher 108 has selected radio button 408; thus, video data file "backhand1.mp4" is opened by thereafter selecting "Select Video" button 412. Backhand1.mp4-503 is thus displayed as shown in FIG. 5.

Figure 5:
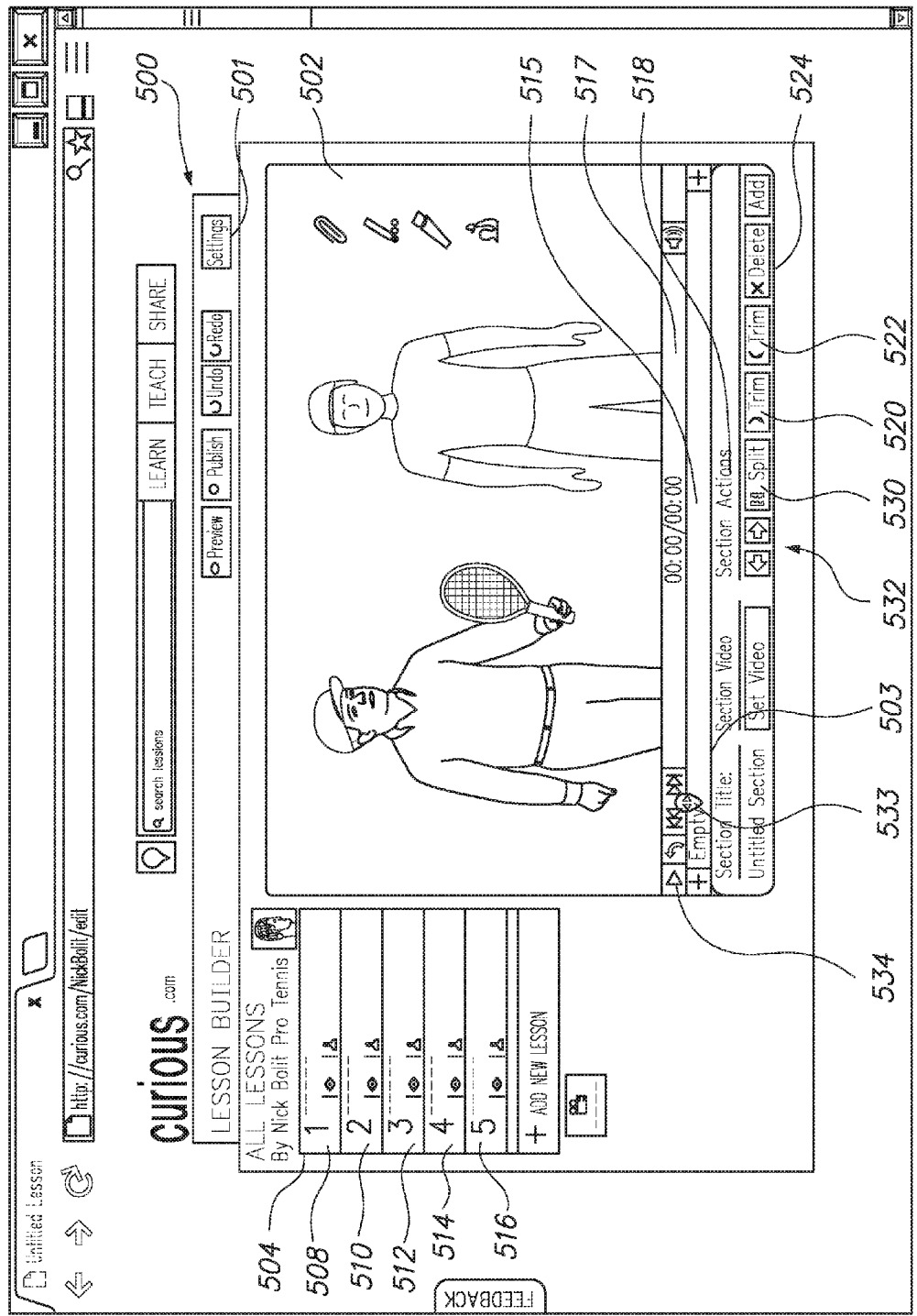
FIG. 5 is a screenshot illustrating a lesson builder interface according to an exemplary embodiment of the present invention.

FIG. 5 is a screenshot illustrating lesson builder interface 500 according to an exemplary embodiment of the present invention.

In FIG. 5, specifically, the exemplary single interface, lesson builder interface 500 is shown. Here, lesson builder interface 500 includes main display area or video display area 502 for displaying a video lesson for editing/building. As shown, video display area 502 is currently displaying tennis lesson 503 (backhand1.mp4).

In one embodiment, the length and height and aspect ratio of video display area 502 can be varied consistent with the spirit and scope of the present invention. Moreover, all references to windows can be construed as being equivalent to display areas.

Lesson builder interface 500 also includes index area or lesson index display area 504 adjacent to video display area 502 for displaying an index or a list of video lessons that are associated with the corresponding video lesson playing in video display area 502.

As shown, lesson index display area 504 includes a plurality of lesson placeholder areas, which are shown as horizontal bars distinctly separated from each other. Specifically, lesson placeholder areas are lesson "1" 508, lesson "2" 510, lesson "3" 512 and lesson "4" 514 and lesson "5" 516. Each placeholder area may receive metadata such as the lesson number, a title identifying each lesson, etc. Typically, this title can be entered directly or can be selected using settings button 501, discussed below.

When teacher 108 requests that a lesson be created, an empty vessel (not shown) for that lesson is created. The empty vessel is no more than a configuration file that stores all of the instructions for the created lesson (including instructions to play the video data file associated with the lesson). Contemporaneously, a corresponding placeholder area that is associated with the empty vessel is created.

Thus, each lesson placeholder area for lesson "1" 508, lesson "2" 510, lesson "3" 512 and lesson "4" 514 and lesson "5" 516 has an empty vessel associated with it that plays video data files for the corresponding lesson. If teacher 108 uses a pointing device to select lesson "1" 508, the instructions contained in the empty vessel associated with placeholder area lesson "1" 508 are executed.

Here, the instructions might be to play a specific video data file associated with lesson 1 so that the video data file (and lesson 1) begins to play. Thus, when backhand1.mp4 (FIG. 4) is selected, tennis lesson 503 is associated with placeholder area lesson "1" 508, selection of which executes instructions to play tennis lesson 503 in video display area 502.

In FIG. 5, lesson interface 500 also enables teacher 108 to directly enter lesson titles in index display area 504. Thus, the text "Untitled lesson" can be directly replaced by entering the appropriate name for tennis lesson 503. Thus an advantage of the present invention is that instructors and end users during playback can easily identify and start lessons from a single interface. A further description may be found in co-pending patent application Ser. No. 13/624,581, entitled Embeddable Video Playing System and Method, filed Sep. 21, 2012, which is hereby incorporated by reference as if fully set forth in the present specification.

To add a new lesson, additional empty vessels and corresponding placeholder areas can be added with "ADD NEW LESSON" button 519. A person skilled in the art will recognize that other configurations for creating a lesson and associating video data files with the lesson are possible.

Another advantage of the present invention is that lesson builder interface 500 is a single display interface generated substantially at the same time as its components video display area 502 and lesson index display area 504. In this manner, additional windows that add complexity and multiple steps need not be generated during the lesson creation process.

In FIG. 5, lesson builder interface 500 also includes video control bar 517 displayed upon hover by a user input device. As shown, video control bar 517 has a plurality of control buttons including play/pause button 534.

Video control bar 517 also includes timeline 515 and progress indicator or playhead 533. As implied by its name, timeline 515 is a temporal representation of video lessons, here, of tennis lesson 503. Tennis lesson 503 is represented on the entire width of timeline 515. As tennis lesson 503 is played, playhead 533 advances over timeline 515 until the entire video lesson is played. Another advantage of the present invention is that timeline 515 and playhead 533 operate like a player during the editing.

Another advantage is that timeline 515 has a fixed width. Thus, as described with reference to figures below, timeline 515 remains unchanged when video data files are added to the timeline or when video data files represented on the timeline are deleted.

Once video lesson "backhand1.mp4" begins to play, teacher 108 can begin various editing/building operations using various buttons located in section action 518. As shown, such buttons include split button 530; move buttons 532; trim buttons 520 and 522, all of which can be selected by teacher 108 to initiate desired operations. Settings button 501 also permits labeling of the various sections.

In use, as tennis lesson 503 plays, a typical initial operation is for teacher 108 to use split button 530 to split tennis lesson 503 into various time sections as desired. Tennis lesson 503 may be spliced up based on key concepts, subtopics, themes or different concepts taught by teacher 108. Splitting may also be based on lesson highlights, important points, introductory material and summaries, etc.

Once teacher 108 identifies the point/time on timeline 515 to segment tennis lesson 503 based on the position of playhead 533, she then selects split button 530, which automatically segments tennis lesson 503 into two time sections, each time section being independently playable. Teacher 108 may in fact select any contiguous or noncontiguous time section of tennis lesson 503 that is associated with a key concept and then split the selected time section.

Herein is another advantage of the present invention. Concurrently and in real time, as a video lesson is played in the video display area, the section control menu including split button 530 is used to manipulate/edit the video lesson. In this manner, a teacher can know exactly where on the video lesson she wishes to split the video as she views the video.

Unlike conventional systems wherein thumbnails of the video lesson are split and then dragged to a timeline, the present invention manipulates/edits video lessons in real time. Teacher 108 can also use the online video interface of the present invention at any time to retrieve and segment video lessons without need for intervention by third parties such as operators of the website wherein the video lesson is published.

Moreover, in conventional systems for building online courses, once a video data file is added to a course, it can neither be edited nor can it be added to. The video data file can only be removed. Unlike such conventional systems, the present invention permits segmenting of video lessons into time sections as well as addition of new time sections to existing video data files.

Figure 6:
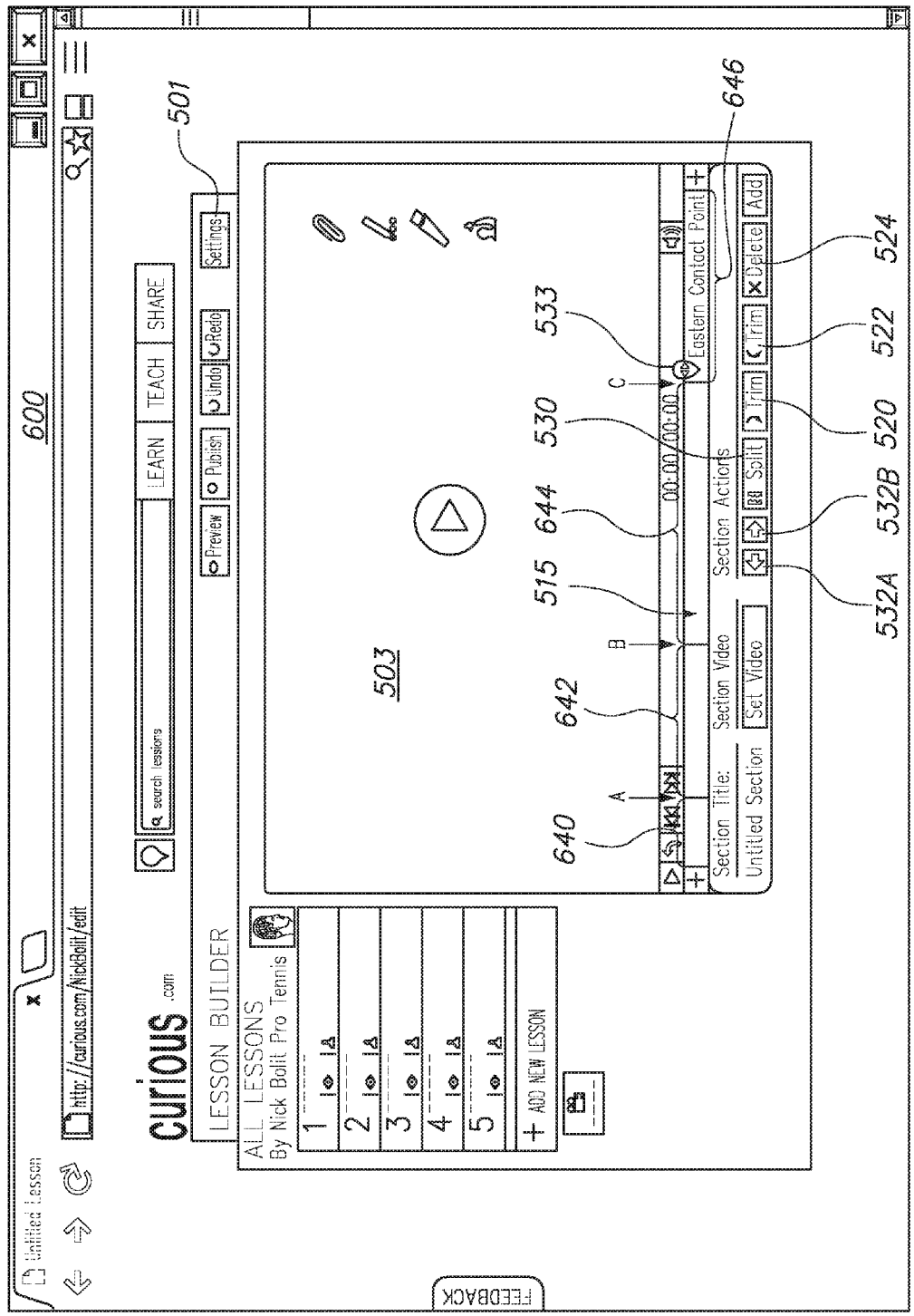
FIG. 6 is a screenshot of a lesson builder interface showing a tennis lesson according to an exemplary embodiment of the present invention.

FIG. 6 is a screenshot of lesson builder interface 600 showing tennis lesson 503 (FIG. 5) according to an exemplary embodiment of the present invention.

In FIG. 6, tennis lesson 503 displays the start of subtopic "Eastern Contact Point," of time section 646. Specifically, based on this subtopic, teacher 108 has split tennis lesson 503 into various time sections including time section 646 beginning at point C on timeline 515.

To create this section, in one embodiment, teacher 108 initially pauses the video lesson at point C. In turn, playhead 533 stops at point C indicating that tennis lesson 503 is paused. Teacher 108 may then select split button 530 to create time section 646. Alternatively, teacher 108 can simply select split button 530 without pausing tennis lesson 503 when playhead 533 reaches point C, the desired split position.

Note that timeline 515 remains at a fixed width even where tennis lesson 503 has been segmented into various time sections. The representation of each time section on timeline 515 essentially remains the same.

Once split button 530 is selected, time section 646 is sectioned off on timeline 515 from the rest of the tennis lesson and becomes independently playable. Quizzes, attachments and other like objects may similarly be hung on the newly created time section. One skilled in the art will realize that split button 530 can be any means, or located anywhere so long as it enables user selection to split the video lesson at a desired point/time. Thus, for example, split button 530 may be a voice-activated input.

Other time sections are created with split button 530 as well. Thus, teacher 108 creates time section 640 as the tennis lesson plays and playhead 533 is initially at point A. Teacher 108 also selects split button 530 to create time section 642 as playhead 533 reaches point B.

As shown, both time sections 644 and 646 are created when playhead 533 reaches point/time C on timeline 515. When selected, split button 530 divides the remainder of the video lesson into time sections 644 and 646 at point/time C. In one embodiment, each respective time section is based on a subtopic of the lesson. That is, each subtopic is related to the topic of the lesson. In an alternate embodiment, each time section is based on a theme.

In one embodiment, each time section is associated with a single video file. By selecting a particular time section, the video file associated with the time section is played. For example, when a user plays a time section, the player streams or downloads and plays the video file associated with the time section.

In FIG. 6, in addition to split button 530, various section operation buttons include move buttons 532A and B; trim buttons 520 and 522; and settings button 501 used for labeling.

When selected by teacher 108, move button 532A shifts a time section leftwards, from its current location to that of the immediately preceding time section. For example, when playhead 533 is on time section 646, selection of move button 532A operates to move time section 646 to the current location time section 644, which is itself shifted right to the former location of time section 646. That is, the locations of time section 646 and time section 644 are switched.

Similarly, when selected by teacher 108, move button 532B shifts a time section rightwards from its current location to that of the immediately succeeding time section. For example, when playhead 533 is on time section 644, selection of move button 532B operates to move time section 644 rightwards to the current location of time section 646, which itself is shifted left to the former location of time section 644. That is, the locations of time section 646 and time section 644 are switched.

When selected by teacher 108, trim button 520 deletes recordings including sections before the selection point (playhead 533). For example, when playhead 533 is at point C of time section 646, selection of trim button 520 operates to delete time sections 640, 642 and 644 leaving time 646.

When selected by teacher 108, trim button 522 deletes sections after the selection point (location of playhead 533). For example, when playhead 533 is at point B, selection of trim button 522 operates to delete time sections 644 and 646 leaving time sections 640 and 642.

When selected by teacher 108, delete button 524 operates to delete the current section. For example, when playhead 533 is at point C of time section 646, selection of delete button 524 operates to delete time section 646 leaving time sections 640, 642 and 644.

In this manner, contiguous and noncontiguous time sections can be moved, trimmed, deleted and organized and played in a linear fashion. The time sections may be from a single video data file or from multiple video data files all of which can be assembled into contiguous time sections, such that each time section is associated with a key concept of the lesson.

Thus, the present invention provides an intuitive online user interface configured to edit, assemble and publish video lessons. Note that all of teacher 108's video lessons are published to a personal website directory dedicated to teacher 108 and configured to store all of the teacher's video lessons. While examples of video lesson editing have been provided, one skilled in the art will realize that the present invention may also be utilized to build one or more video lessons from several disparate video data files as described with reference to FIG. 7.

Figure 7:
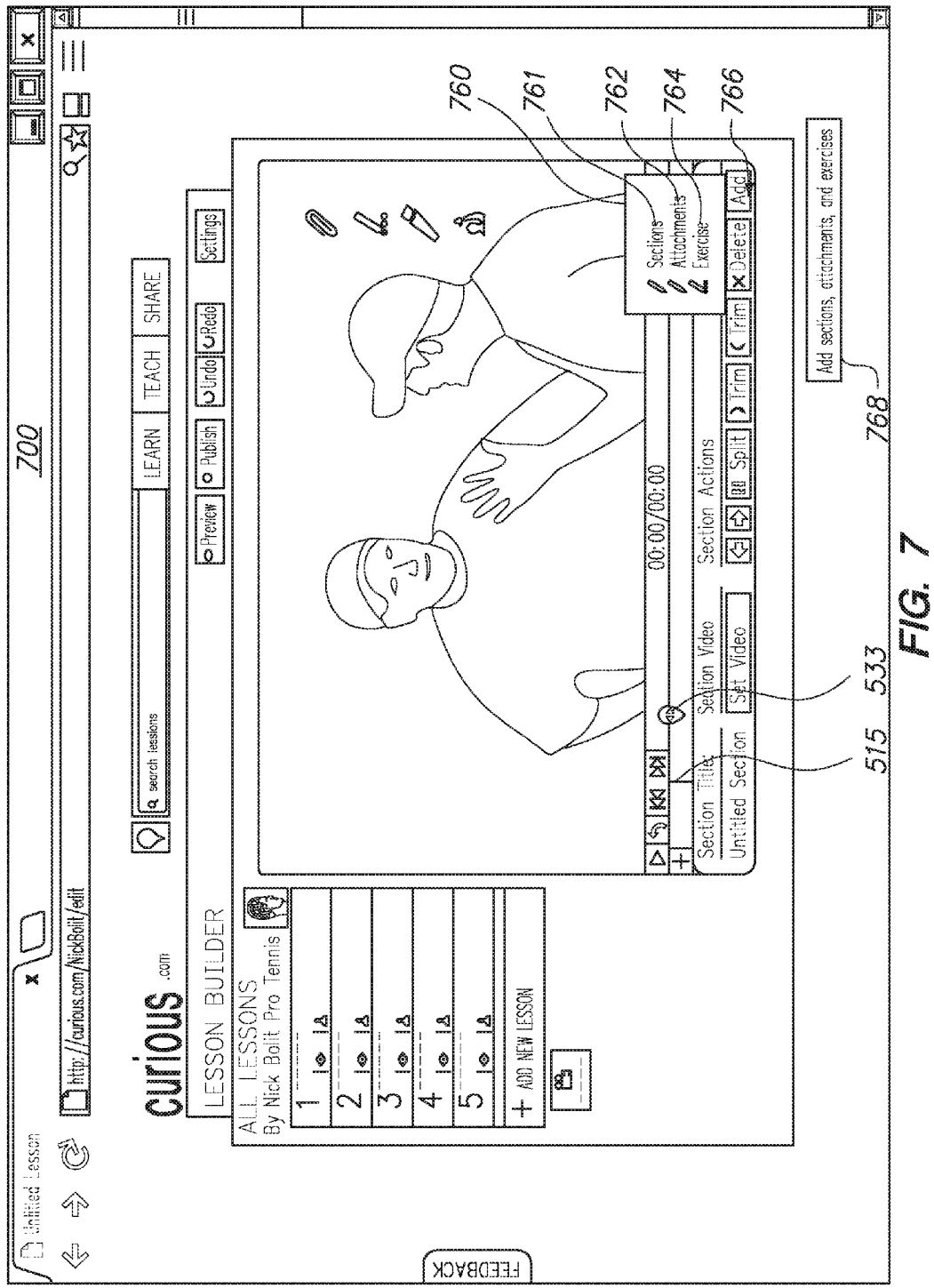
FIG. 7 is a screenshot of a lesson builder interface according to an exemplary embodiment of the present invention.

FIG. 7 is a screenshot of lesson builder interface 700 according to an exemplary embodiment of the present invention.

In FIG. 7, lesson builder interface 700 shows pop-up 760 displayed when teacher 108 selects add button 766. Unlike the embodiment of FIG. 6 where tennis lesson 503 is split into sections, teacher 108 can use add button 766 to build tennis lesson 503 by adding additional time sections. When add button 766 is selected, pop-up 760 having add section icon 761 is displayed.

Upon selection of add section icon 761, file browsing window 406 (FIG. 4) is opened (not shown), enabling teacher 108 to select or upload a desired tennis video data file. The selected video data file is then added at a selected point on timeline 515. Here, the selected tennis video data file is added at point/time E, the location of playhead 533. Further, sections may also be added specifically before or after specific sections by selecting the "+" buttons.

Note also that addition of a new video data file does not change the width of timeline 515. The representation of an existing video data file is simply time-scaled or compressed to fit on timeline 515 based on its duration. The representation of the new video data file is also time scaled in proportion to its duration to fit within timeline 515 along with the existing video data file.

Note that teacher 108 may also add attachments to time sections by selecting attachment icon 762 and can add exercises by selecting exercises icon 764. In this manner, the present invention affords teachers not only the flexibility to edit their video content, but they can also build video content from disparate video content files.

Figure 8:
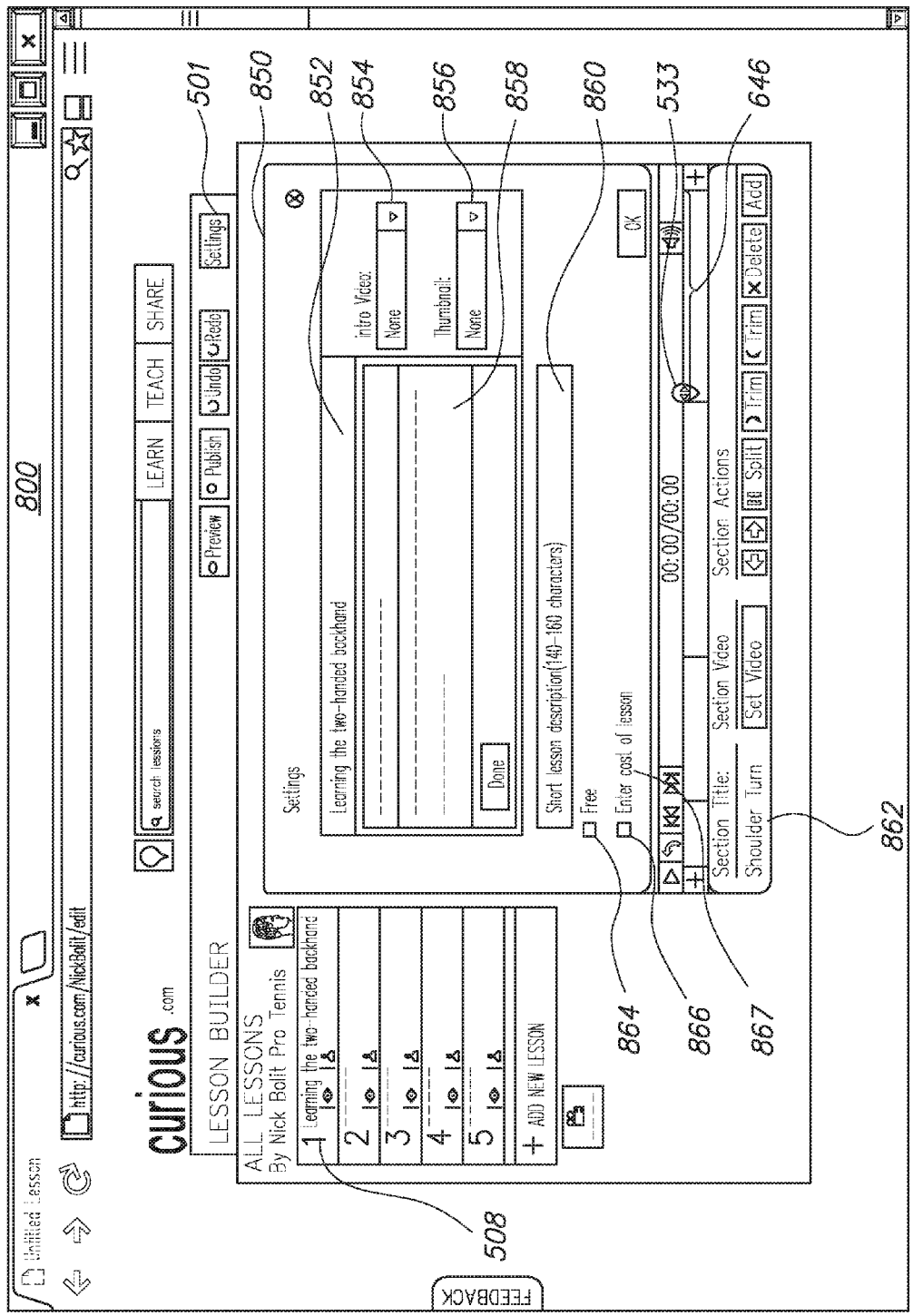
FIG. 8 is a screenshot of a lesson builder interface according to an exemplary embodiment of the present invention.

FIG. 8 is a screenshot of lesson builder interface 800 according to an exemplary embodiment of the present invention.

In FIG. 8, specifically, lesson builder interface 800 shows settings dialog box 850 for entering a lesson title and related descriptions. An advantage of the present invention is that settings dialog box 850 allows teacher 108 to enter all requisite information for identifying and describing a lesson within a single interface.

As shown, setting dialog box 850, which is opened by selecting settings button 501 includes title text box 852 and description text box 858. Once settings dialog box 850 is opened, teacher 108 can use its title text box 852 to enter metadata such as a title for tennis lesson 503. Here, teacher 108 has entered "Learning the Two-Handed Backhand" in title text box 852. Consequently, this title "Learning the Two-Handed Backhand" is displayed as the title of lesson 1 in placeholder area "1" 508 as shown.

Settings dialog box 850 also includes description text box 858 that can be used to enter a long description of the tennis lesson 503. Here, teacher 108 has entered "The two-handed backhand uses the non-dominant hand to provide a more stable hit at contact." This is the description of the tennis lesson provided to students prior to viewing tennis lesson 503.

Setting dialog box 850 also includes short description text box 860 for entering short lesson descriptions. Here, no short description has been entered, but it can be observed that any such description must be between 140-160 characters. Settings dialog box 850 also includes dropdown box 854 for selecting an introduction video as well as dropdown box 856 for selecting a thumbnail.

Setting dialog box 850 also includes checkbox 864 that can be checked if teacher 108 wishes to provide the lesson at no charge to users. If this box is checked, all users and learners may access the tennis lesson at no charge. If checkbox 864 is unchecked, teacher 108 is required to check checkbox 866 and then enter the lesson cost/amount in amount text box 867 for the cost of the lesson.

The amount/cost entered is then displayed along with thumbnails so users can view the cost of the lesson prior to purchase. Teachers can access and manage this process at any time by accessing curative video system 104 of the present invention. In this manner, teachers can determine and enter how much they wish to charge for each lesson and/or series of lessons and can manage such amounts on their own and at their convenience without intervention by third parties.

Lesson builder interface 800 further shows section title text box 862 for entering the title for a section. Each time section has its own title text box for entering a section title. For example, here, time section 646, which is currently playing as indicated by the position playhead 533, has title text box 862, in which the title "Shoulder Turn" has been entered to reflect its title.

Figure 9:
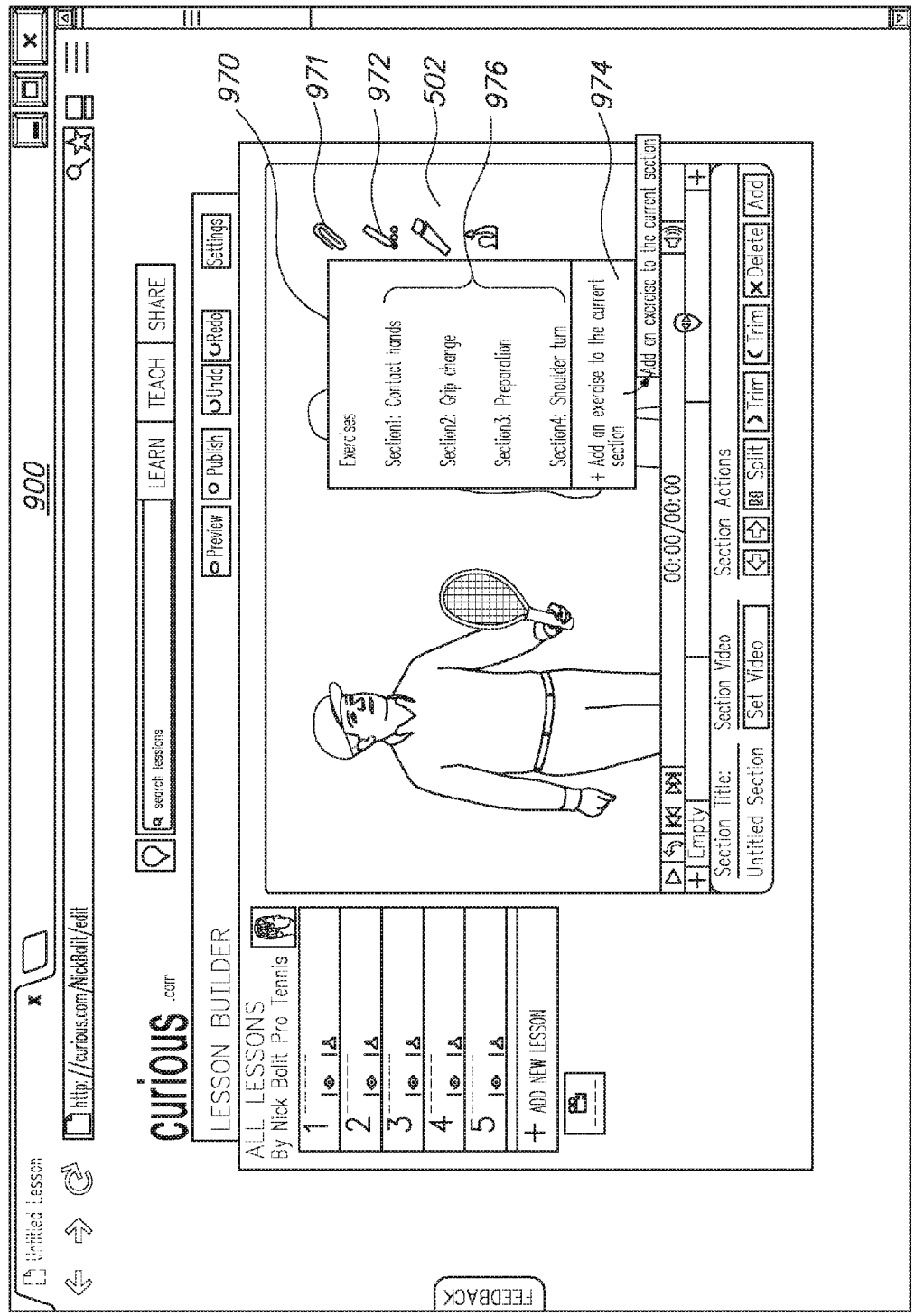
FIG. 9 is a screenshot of a lesson builder interface according to an exemplary embodiment of the present invention.

FIG. 9 is a screenshot of lesson builder interface 900 according to an exemplary embodiment of the present invention.

In FIG. 9, specifically, lesson builder interface 900 shows exercise popup 970 for adding exercises to a current session. Exercise popup 970 is accessible by selecting icon 972 displayed along a vertical edge of video display area 502.

When accessed by teacher 108, exercise popup 970 displays "section titles" 976 for all of the sections created by teacher 108, where the title that is currently playing is grayed out. Note that such section titles are added using title text box 862 described with reference to FIG. 8.

Figure 12:
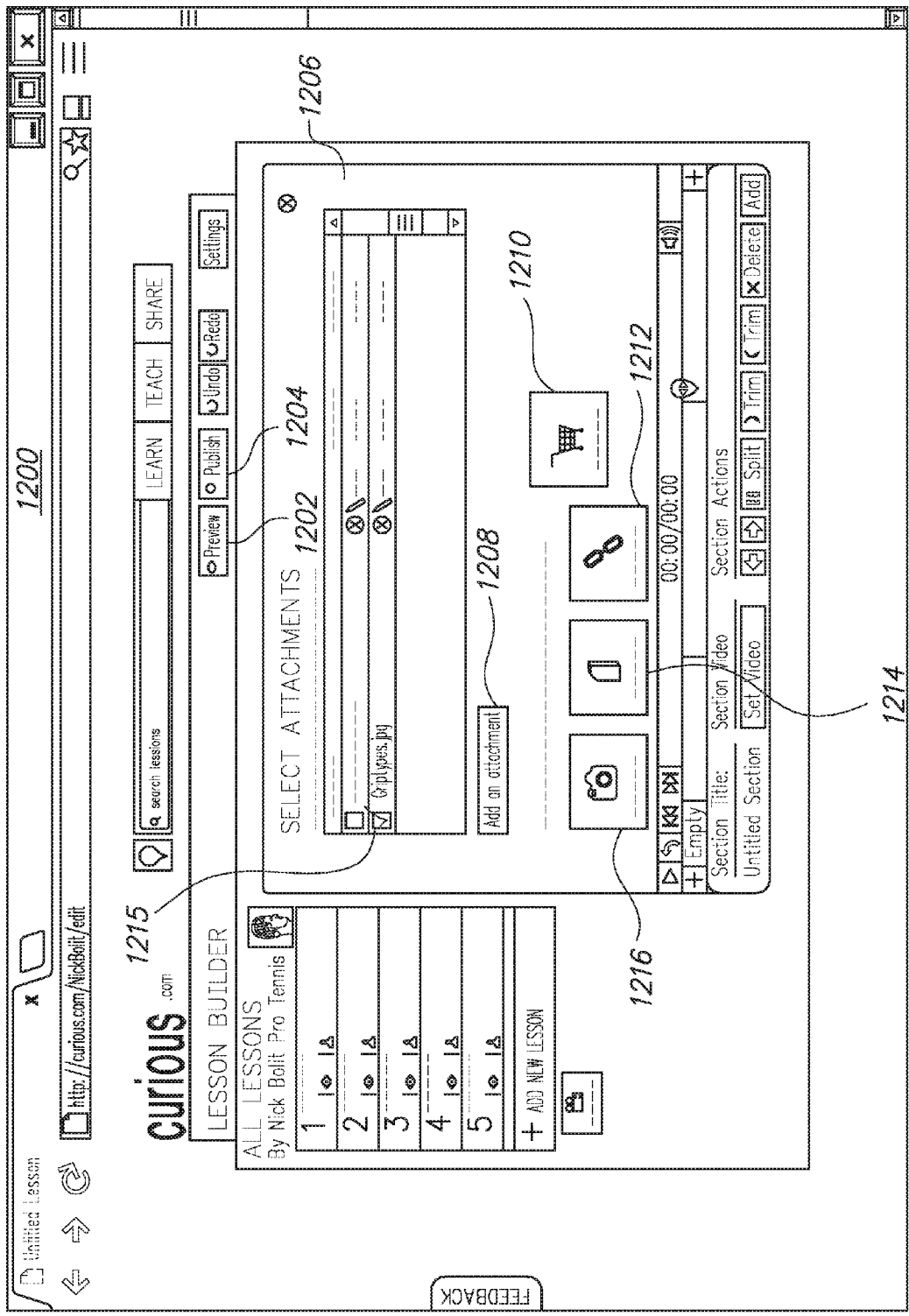
FIG. 12 is a screenshot of a lesson builder interface according to an exemplary embodiment of the present invention.

Exercise popup 970 also displays "Add an exercise to the current section" link 974, which upon selection, adds an exercise or quiz to the current section. Here, teacher 108 has selected "Add an exercise to the current section" link 974, to add an exercise to "Section 4: Shoulder Turn," which is the current section, as further discussed with reference to FIG. 10. In FIG. 9, lesson interface builder 900 also shows paper clip icon 971 configured to file browsing window 1206 (FIG. 12).

Figure 10:
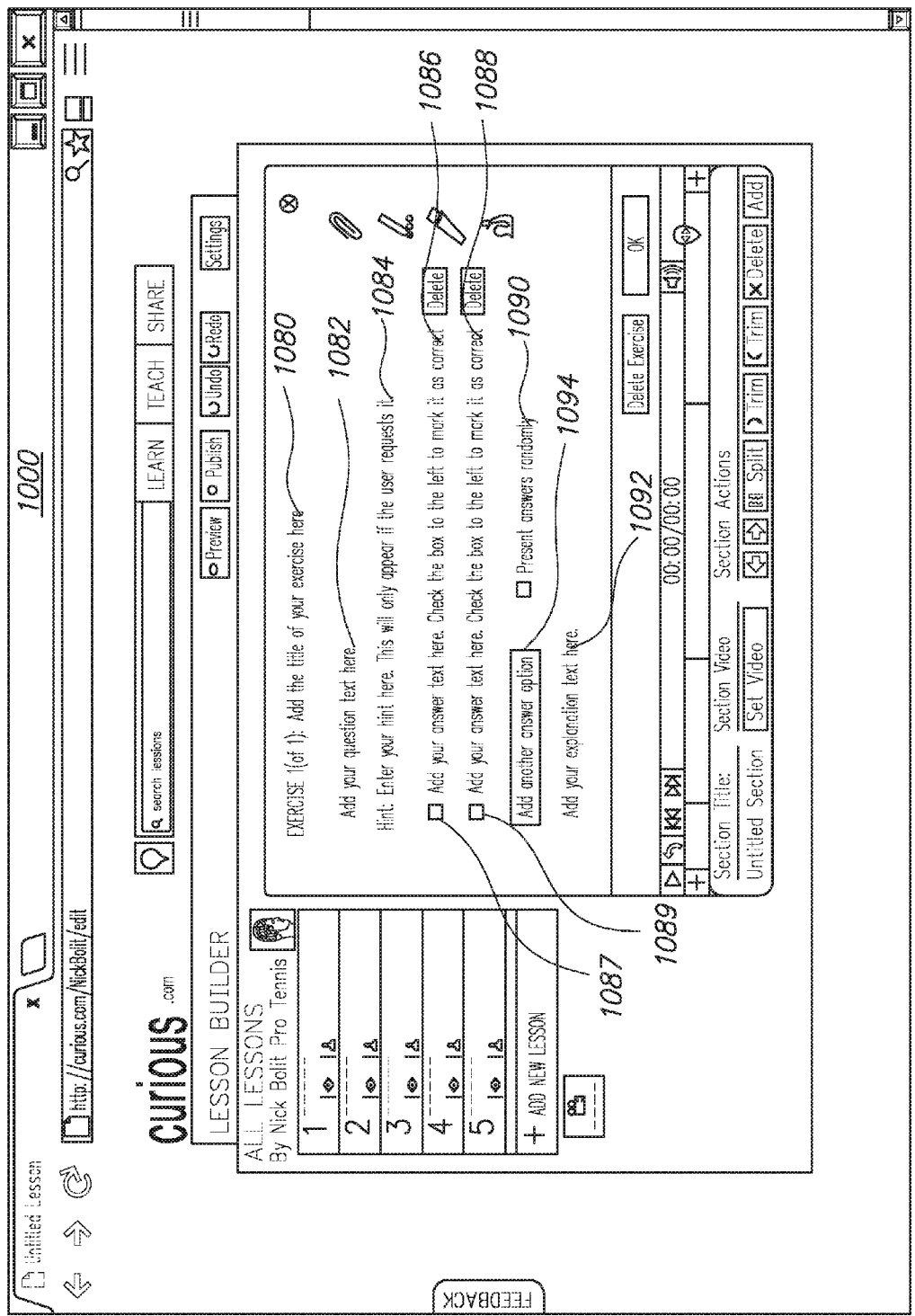
FIG. 10 is a screenshot of a lesson builder interface according to an exemplary embodiment of the present invention.

FIG. 10 is a screenshot of lesson builder interface 1000 according to an exemplary embodiment of the present invention.

In FIG. 10, lesson builder interface 1000 enables teacher 108 to create an exercise for the current section. Thus, when a student such as user 102 plays the section, user 102 can answer the questions in that exercise created for the section.

This is but another advantage of the present invention. Unlike conventional systems, the present invention allows teachers to create exercises to test a learner's knowledge of particular time sections on a section-by-section basis. Most learning occurs by testing what was previously learned to determine what is retained and what is understood.

To create an exercise, teacher 108 may use title text box 1080 to add an exercise title, employ text box 1082 to add question text for the exercise and use text box 1084 to add a hint. A hint provides a clue to an exercise answer.

Teacher 108 can also use text box 1086 to add answer text; if this answer is the correct answer choice for the exercise question, the teacher also selects corresponding checkbox 1087. The same goes for text box 1088. Teacher 108 can use text box 1088 to add an additional answer text; if this answer text is the correct answer choice, corresponding checkbox 1089 is selected. Teacher 108 can also use text box 1092 to add explanation text for the exercise.

If another answer choice is desired, teacher 108 uses "Add Another Answer Option" button 1094 to add another answer choice. If checkbox 1090 is checked, all answer choices are randomly presented. Those skilled in the art, in light of the present teachings, will recognize that the exercise format need not include multiple answer choices and in fact may include no answer choice at all.

Figure 11A:
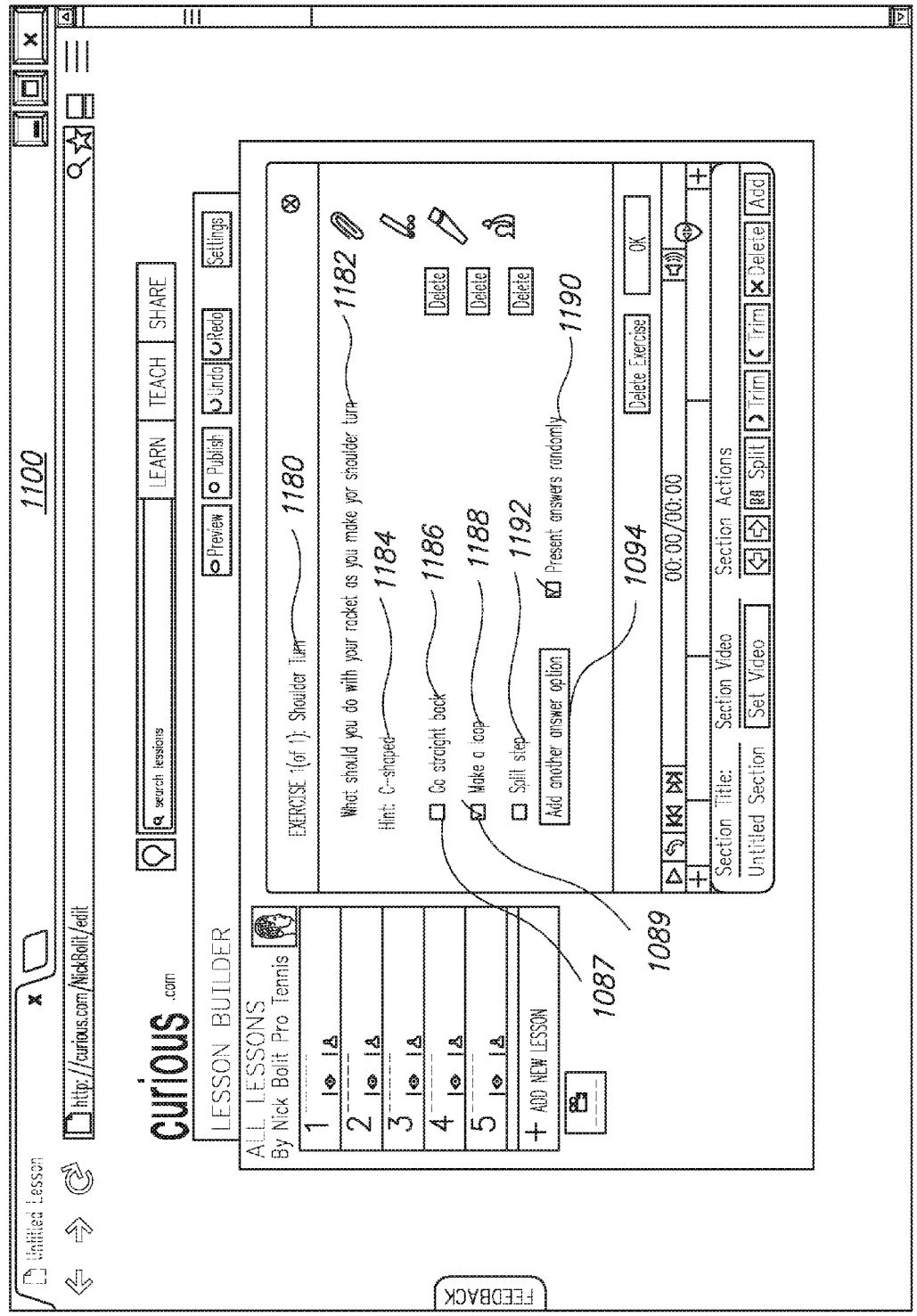
FIG. 11A is a screenshot of a lesson builder interface according to an exemplary embodiment of the present invention.

FIG. 11A is a screenshot of lesson builder interface 1100 according to an exemplary embodiment of the present invention.

In FIG. 11A, lesson builder interface 1100 shows an exercise created for a time section of tennis lesson 503. Here, teacher 108 has used title text box 1080 (FIG. 10) to enter text "Shoulder Turn" 1180 since "Shoulder Turn" is the section title. Teacher 108 has also employed text box 1082 (FIG. 10) to enter question text for the exercise. Specifically, text "What should you do with your racket as you make your shoulder turn?" 1182 has been entered as the question. This question is of course displayed to users upon conclusion of the section. If there is no associated question, the system may proceed to play the next available section.

In FIG. 11A, teacher 108 has further used text box 1084 (FIG. 10) to add a hint, "C-Shaped" 1184, which is a clue to the exercise answer "Make a loop," since a loop is C-Shaped. Teacher 108 has also employed text box 1086 (FIG. 10) to add answer text "Go straight back" 1186; and here, since this is an incorrect answer choice, its corresponding checkbox remains unchecked.

Text box 1086 has also been used to add answer text "Make a loop" 1188; and here, since this is a correct answer choice, its corresponding checkbox 1089 is checked. Thus, upon conclusion of playback of this section and user 102 selects this answer choice, it is affirmed as the correct answer after which tennis lesson 503 can proceed to the next section.

Since another answer choice is desired, teacher 108 uses "Add Another Answer Option" button 1094 (FIG. 10) to add another answer choice text "split step" 1192. This answer choice is incorrect and as such its checkbox remains unchecked. Further, checkbox 1090 (FIG. 10) is checked; thus all answer choices are randomly presented.

Figure 11B:
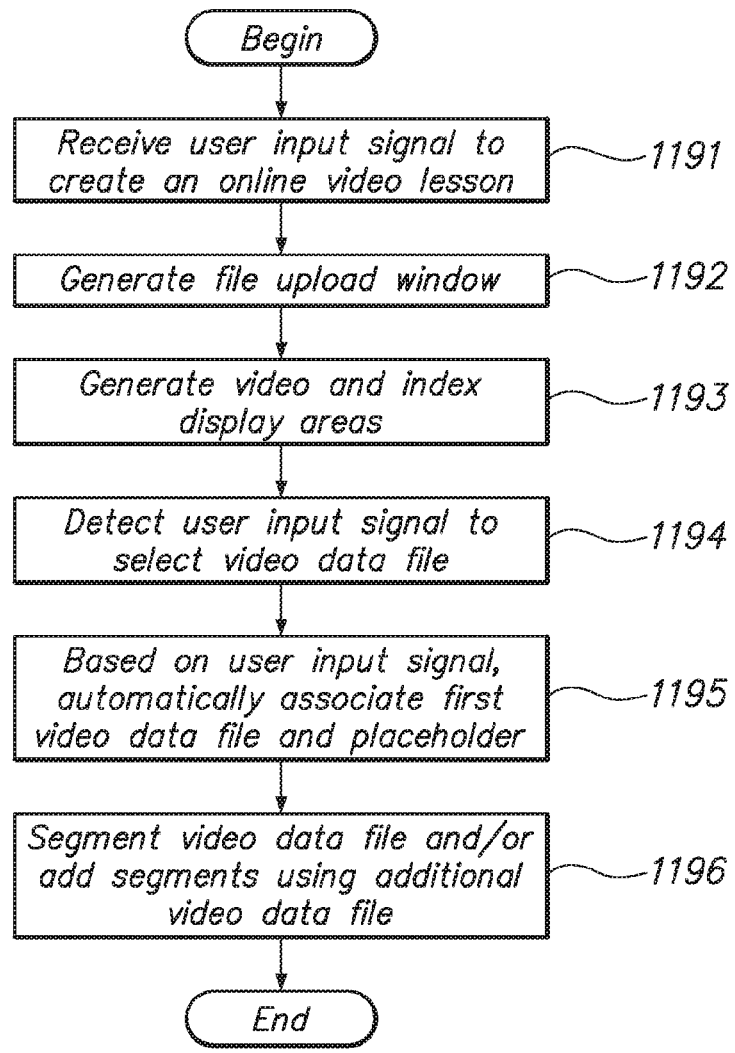
FIG. 11B is a flowchart illustrating a video building method according to an exemplary embodiment of the present invention.

FIG. 11B is a flowchart illustrating video building method 1190 according to an exemplary embodiment of the present invention.

In FIG. 11B, at block 1191, an input signal by teacher 108 to create a new online video lesson is received by lesson builder 118 of curative video server system 104 (FIG. 1). Teacher 108 might transmit the input signal using an HTTP request via a browser (not shown) running on client laptop 110.

As an example, teacher 108 can select "Create a New Lesson" link 302 (FIG. 3) to create a new video lesson. The video lesson itself might have one or more lectures or lessons, each of which can be independently displayed by student viewers. The video lesson may be based on one or more video data files (e.g., mp4 files, etc) uploaded by teacher 108.

At block 1192, responsive to the user-input signal, a file upload window (e.g., file browsing window 406 of FIG. 4) configured to upload a plurality of video data files is displayed. Teacher 108 browses a local file storage and selects video data files for uploading from client laptop 110 to curative video server system 104. Each video data file consists of lesson frames keyed to concepts of a lecture. This allows lesson frames associated with specific concepts to be identified and segmented according to precepts of the present invention.

At block 1193, video and index display areas such as video display area 502 (FIG. 5) and lesson index display area 504 (FIG. 5) are generated adjacent to each other. Video display area 502 displays video lessons for editing/building and lesson index display area 504 includes a plurality of lesson placeholders areas lesson "1" 508, lesson "2" 510, lesson "3" 512, lesson "4" 514, lesson "5" 516 all of FIG. 5.

At block 1194, a user input signal from teacher 108 is received to select a first video data file from multiple video files previously uploaded. As an example, in FIG. 4, specifically, file browsing window 406, displayed over secondary display window 404, has been opened by teacher 108 to select the desired video data file for the first lesson. Here, file browsing window 406 indicates that two video data files, backhand1.mp4 and backhand2.mp4, are available for selection, of which teacher 108 has selected backhand1.mp4.

At block 1195, responsive to the user-selection signal, the first video data file is associated with an empty vessel (not shown) for lesson one so that the first video lesson begins to play in the video display area 502. Further, when the corresponding placeholder area lesson "1" 508 is selected in lesson index display area 504, lesson one also begins to play.

At block 1196, the first video data file might then be segmented into two or more time sections, each time section keyed to a concept of the lesson. Alternatively or in addition to segmentation, teacher 108 might choose to select a second video data file from the uploaded video data files to add the second video file to the first video file to create an additional time segment for the first video lesson. Although not referenced, one skilled in the art will realize that other comparable methods for video building consistent with the spirit and scope of the present invention may be utilized.

FIG. 12 is a screenshot of lesson builder interface 1200 according to an exemplary embodiment of the present invention.

In FIG. 12, lesson builder interface 1200 shows file browsing window 1206 for embedding attachments such as files or external Internet web links into video lessons. Such attachments might be video files, images and the like. File browsing window is opened by selecting paperclip icon 971 (FIG. 9) or This embedding functionality that can be accessed at any time during video-play is another benefit of the present invention. Unlike conventional video lessons that display documents that are no longer viewable after the video frame has played, user 102 can view attachments or links at any time during video lesson play.

In FIG. 12, file browsing window 1206 is open, and checkbox 1215 in this window is checked to select an attachment griptypes.jpg that demonstrates the various tennis grip types in a single image. After checkbox 1215 is selected, "Add attachment(s)" button 1208 is selected to embed griptypes.jpg into the requisite section of the tennis lesson. Teacher 108 can also select "Upload" button 1216 to upload photos; "Upload file" button 1214 to upload files; "Add Link" button 1212 to add a URL; and "Add" button 1210 to add an Amazon.com link.

Lesson builder interface 1200 also includes preview button 1202 for previewing lessons prior to publication and publish button 1204 for publishing lessons. Herein is another advantage of the present invention. When all editing, assembling, and previewing of tennis lesson 503 has been completed, teacher 108 can select publish button 1204 to publish tennis lesson 503 on the web. Unlike conventional systems, all of teacher 108's video lessons are published to a website dedicated only to teacher 108. A profile page (not shown) includes this website URL as well as a teacher bio, all video lessons/ thumbnails offered by teacher 108 and other relevant information for viewing by online users. Thus, teacher 108 can advertise this website and consider it a personal one.

Figure 13:
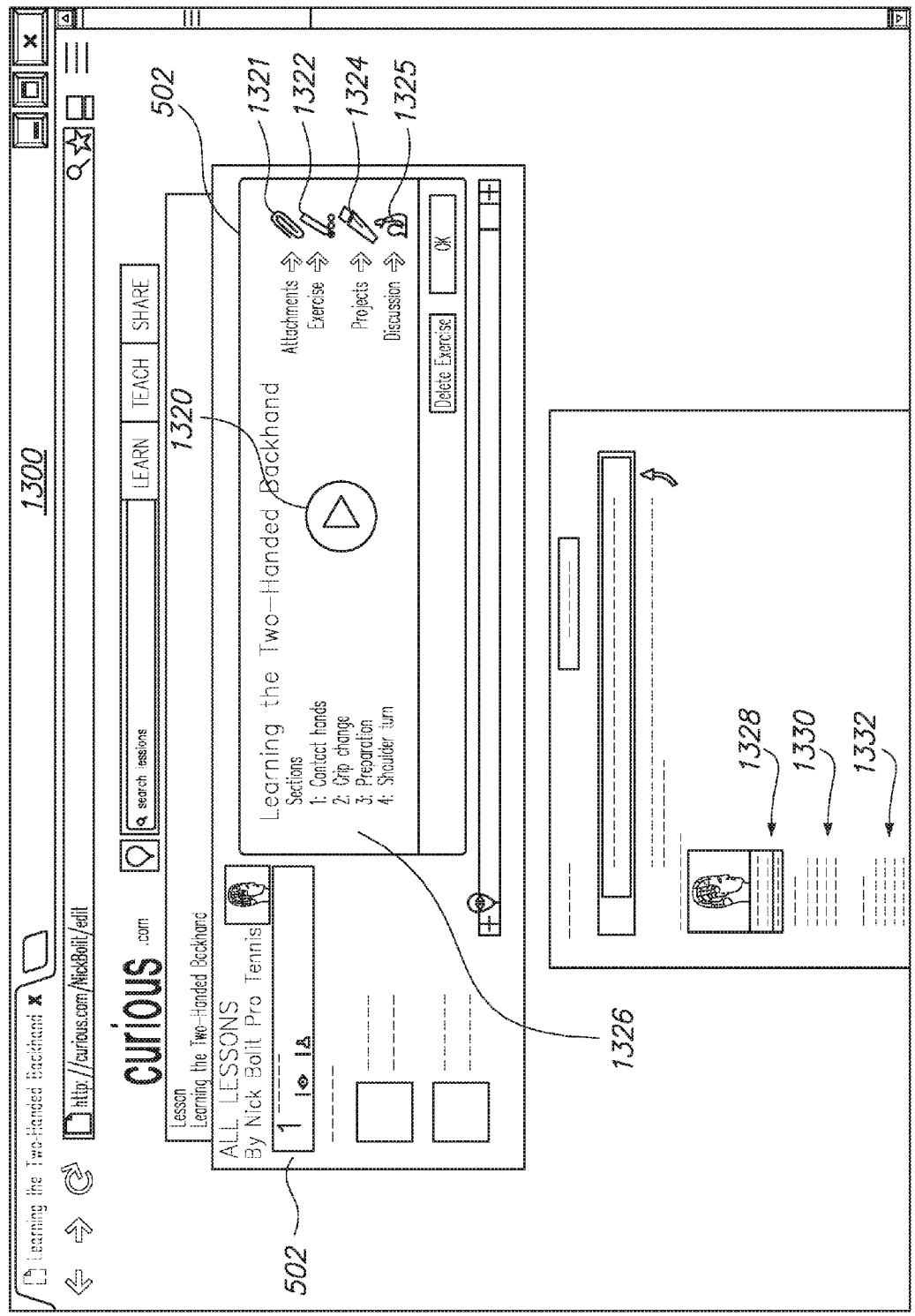
FIG. 13 is a screenshot of a lesson builder interface according to an exemplary embodiment of the present invention.

FIG. 13 is a screenshot of lesson builder interface 1300 according to an exemplary embodiment of the present invention.

In FIG. 13, lesson builder interface 1300 illustrates a preview of tennis lesson 503 prior to publication. Teacher 108 previews a lesson by selecting preview button 1202 of FIG. 12. Lesson builder interface 1300 is then displayed within video display area 502. Here, as shown, tennis lesson titled "Learning the Two-Handed Backhand" is displayed.

Teacher 108 may then use play button 1320 located proximately midpoint of video display area 502 to play the video lesson. A lesson number "1" corresponding to tennis lesson 503 is also displayed within lesson index display area 504. Here, the teacher 108 can then use play button 1320 to play the lesson to determine whether it is ready for publication. Alternatively, teacher 108 may use each of section links 1326 to preview each corresponding section of tennis lesson 503.

Teacher 108 may also select paperclip icon 1321 to preview attachments or select exercise icon 1322 to preview exercises. Projects icon 1324 is used to preview project edits. Teacher profile 1328, table of content 1330 and lesson description 1332 may also be viewed.

Figure 14A:
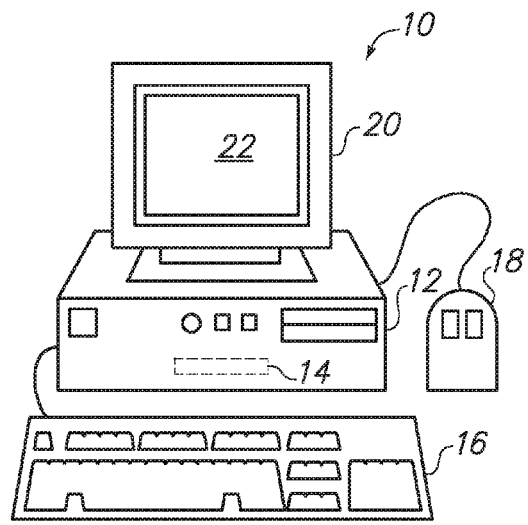
FIG. 14A shows a typical computer such as would be operated by a user on the Internet.

FIG. 14A shows a typical computer 10 such as would be operated by a user on the Internet. Computer 10 includes a cabinet 12 housing familiar computer components such as a processor, memory, disk drive, Compact Digital Read-Only Memory (CDROM), etc. (not shown). User input devices include keyboard 16 and mouse 18. Output devices include display 20 having a display screen 22. Naturally, many other configurations of a computer system are possible. Some computer systems may have other components in addition to those shown in FIG. 14A while others will have fewer components. For example, server computers need not have attached input and output devices since they may only be accessed from time to time by other computers over a network. Human interaction with such a server computer can be at another computer that is equipped with input and output devices. Input and output devices exist in many variations from those shown in FIG. 14A. Displays can be liquid crystal displays (LCD), computer monitors, plasma, etc. Input devices can include a trackball, digitizing tablet, microphone, etc. In general, use of the term "input device" is intended to include all possible types of devices and ways to input information into a computer system or onto a network. Likewise the term "output device" includes all possible types of devices and ways to output information from a computer system to a human or to another machine.

The computer itself can be of varying types including laptop, notebook, palm-top, pentop, etc. The computer may not resemble the computer of FIG. 14A as in the case where a processor is embedded into another device or appliance such as an automobile or a cellular telephone. Because of the ever-changing nature of computers and networks, the description of hardware in this specification is intended only by way of example for the purpose of illustrating the preferred embodiment. Any distributed networked system capable of executing programmed instructions is suitable for use with the present invention.

Figure 14B:
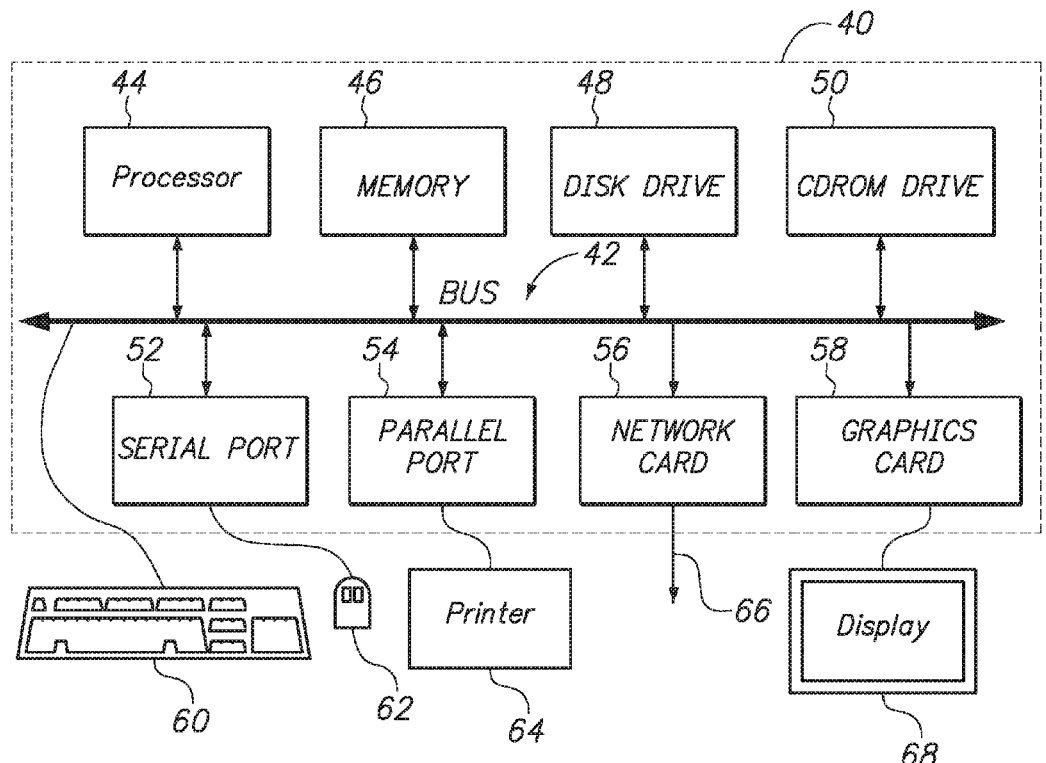
FIG. 14B shows subsystems of the computer of FIG. 14A.

FIG. 14B shows subsystems of the computer of FIG. 14A. In FIG. 14B, subsystems within box 40 are internal to, for example, the cabinet 12 of FIG. 14A. Bus 42 is used to transfer information in the form of digital data between processor 44, memory 46, disk drive 48, CDROM drive 50, serial port 52, parallel port 54, network card 56 and graphics card 58. Many other subsystems may be included in an arbitrary computer system, and some of the subsystems shown in FIG. 14B may be omitted. External devices can connect to the computer system's bus (or another bus or line, not shown) to exchange information with the subsystems in box 40. For example, devices such as keyboard 60 can communicate with processor 44 via dedicated ports and drivers (shown symbolically as a direct connection to bus 42). Mouse 62 is connected to serial port 52. Devices such as printer 64 can connect through parallel port 54. Network card 56 can connect the computer system to a network. Display 68 is updated via graphics card 58. Again, many configurations of subsystems and external devices are possible.

While the above is a complete description of exemplary specific embodiments of the invention, additional embodiments are also possible. Thus, the above description should not be taken as limiting the scope of the invention, which is defined by the appended claims along with their full scope of equivalents.

We claim:

1. An online, computer implemented-method that uses one or more video data files for building an online video lesson having one or more lessons, the method operable upon receiving a request from a remote user/instructor to create the online video lesson, the computer-implemented method comprising:

receiving a first one or more video data files from said remote user, each video data file configured to teach key concepts for the online video lesson;

generating a single display interface having at least a video display area and a lesson list display area, the video display area configured to display the first video data file and other video data files associated with one or more lessons, the lesson list display area configured to display an index of all lessons available for playing in the video display area, said index of all lessons representing segmented time sections of the one or more video data files;

generating a timeline with a playhead in the video display area, wherein the timeline represents the first video data file in a temporal order, said playhead progressing along the timeline to indicate a position of the first video data file in time as the first video data file is played, wherein the timeline includes segmented time sections of the one or more video data files;

using the first video data file to create a first lesson configured to play in the video display area, wherein said first lesson can be initiated by selecting an identifier for the first lesson from the index of lessons in the lesson list display area; and editing, in real time as the first lesson is played, contiguous and noncontiguous elements of the first video data file into a plurality of segmented time sections, wherein each segmented time section is associated with a key concept of the first lesson, wherein the first lesson including the key concepts of the plurality of segmented time sections are configured to be played linearly in the video display area, wherein each segmented time section is independently playable.

2. The method of claim 1 wherein said editing occurs at the position of the playhead as the first lesson is played.

3. The method of claim 1 wherein said editing is initiated by an end user via a section control interface displayed on the video display area,
wherein the section control interface includes at least one of a split control button configured to segment the first video data file or a time section into two contiguous time sections, at least an add control button configured to utilize a second video data file to add an additional time section to the first lesson; at least a trim control button configured to discard video data either before or after the playhead; and at least a move control button configured to shift the current time section either backwards or forwards on the timeline.

4. The method of claim 1 wherein said editing is by receiving a title of a time section via a text box as the corresponding time section is being played in the video display area.

5. The method of claim 1 wherein said editing is by receiving the identifier for the first lesson via a text box in the lesson list display area as the first lesson is played in the video display area.

6. The method of claim 1 wherein said timeline has a fixed width.

7. The method of claim 6 wherein the first video data file is represented over the entirety of the fixed width.

8. The method of claim 6 wherein said fixed width remains unchanged when a second video data file is added to the first lesson and both the first video data file and second video data file are represented on said timeline.

9. The method of claim 8 wherein the first and second video data files are represented on the entirety of said fixed timeline in proportion to the duration of each video data file.

10. The method of claim 7 wherein when a time section of the first video data file is deleted, the remaining one or more time sections are lengthened to occupy the entirety of the fixed width time line.

11. The method of claim 1 further comprising
embedding a quiz and corresponding answer choices for the quiz in the first lesson.

12. The method of claim 1 further comprising
embedding an attachment file or link that is referenced in the first lesson; and
generating a secondary display area separate from the video display area, said secondary display area being configured to view the attachment file or link during playback of the first lesson.

13. The method of claim 9 wherein the first video data file is used to create a first lesson by: generating an empty vessel configured to retain instructions to play the first video data file; and associating the first video data file with the empty vessel whereby the first video data file automatically begins to play in the video display area.

14. An online, computer implemented-method that uses one or more video display data files for building an online video lesson having one or more lessons, the method comprising:
receiving a first one or more video data files from said remote user, each video data file configured to teach a plurality of key concepts for the online video lesson, said first one or more video data files being configured to be editable;
generating a single display interface configured to display the first one or more video data files;
generating a timeline with a playhead in the single display interface, wherein the timeline includes segmented time sections of the one or more video data files, wherein the timeline represents the first video data file in a temporal order, said playhead progressing along the timeline to indicate a position of the first video data file in time as the first video data file is played in the single display interface;
using the first video data file to create a first lesson configured to play in the single display interface; and
editing, in real time as the first lesson is played in the single display interface, contiguous and noncontiguous elements of the first video data file into a plurality of segmented time sections, wherein each segmented time section is associated with a key concept of the first lesson, wherein the first lesson including said key concepts is configured to be played linearly in the single display interface and
wherein each segmented time section is independently playable.

15. The method of claim 14 wherein the first video data file is used to create a first lesson by: generating an empty vessel configured to retain instructions to play the first video data file; and associating the first video data file with the empty vessel whereby the first video data file automatically begins to play in the single display interface.

16. The method of claim 14 wherein said editing occurs at the position of the playhead as the first lesson is played.

17. The method of claim 14 wherein said editing is initiated by an end user via a section control interface displayed on the single display interface;
wherein the section control interface includes at least one of a split control button configured to segment the first video data file or a time section into two contiguous time sections, at least an add control button configured to utilize a second video data file to add an additional time section to the first lesson; at least a trim control button configured to discard video data either before or after the playhead; and at least a move control button configured to shift the current time section either backwards or forwards on the timeline.

18. The method of claim 14 wherein said editing is by receiving a title of a time section via a text box as the corresponding time section is being played in the single display interface.

19. The method of claim 14 wherein said editing is by receiving a title for the first lesson via a text box displayed in the single display interface as the first lesson is played.

20. The method of claim 14 wherein said timeline has a fixed width.

21. The method of claim 20 wherein the first video data file is represented over the fixed width.

22. The method of claim 20 wherein said fixed width remains unchanged when a second video data file is added to the first lesson and both the first video data file and second video data file are represented on said timeline.

23. The method of claim 22 wherein the first and second video data files are represented on the entirety of said fixed timeline in proportion to the duration of each video data file.

24. The method of claim 20 wherein when a time section of the first video data file is deleted, the remaining one or more time sections are lengthened to occupy the entirety of the fixed width time line.

25. The method of claim 14 further comprising
embedding a quiz and corresponding answer choices for the quiz in the first lesson.

26. The method of claim 14 further comprising
embedding an attachment file or link that is referenced in the first lesson; and
generating a secondary display area separate from the video display area, said secondary display area being configured to view the attachment file or link during playback of the first lesson.

27. A computer program product including a non-transitory computer readable storage medium and including computer executable code for creating a video builder, the code when executed by a processor adapted to perform the steps comprising:
receiving a first one or more video data files from said remote user, each video data file configured to teach a plurality of key concepts for the online video lesson, said first one or more video data files being configured to be editable;
generating a single display interface configured to display the first one or more video data files;
generating a timeline with a playhead in the single display interface, wherein the timeline includes segmented time sections of the one or more video data files, wherein the timeline represents the first video data file in a temporal order, said playhead progressing along the timeline to indicate a position of the first video data file in time as the first video data file is played in the single display interface;
using the first video data file to create a first lesson configured to play in the single display interface; and
editing, in real time as the first lesson is played in the single display interface, contiguous and noncontiguous elements of the first video data file into a plurality of segmented time sections, wherein each segmented time section is associated with a key concept of the first lesson, wherein the first lesson including the key concepts of the plurality of time sections are configured to be played linearly in the single display interface and wherein each segmented time section is independently playable.

28. The computer program of claim 27 wherein the first video data file is used to create a first lesson by: generating an empty vessel configured to retain instructions to play the first video data file; and associating the first video data file with the empty vessel whereby the first video data file automatically begins to play in the single display interface.

29. The computer program of claim 27 wherein said editing occurs at the position of the playhead as the first lesson is played.

30. The computer program of claim 27 wherein said editing is initiated by an end user via a section control interface displayed on the single display interface,
wherein the section control interface includes at least one of a split control button configured to segment the first video data file or a time section into two contiguous time sections, at least an add control button configured to utilize a second video data file to add an additional time section to the first lesson; at least a trim control button configured to discard video data either before or after the playhead; and at least a move control button configured to relocate a current time section to another position on the timeline before or after an adjacent time section.

* * * * *